(12) United States Patent
Oda et al.

(10) Patent No.: US 8,653,225 B2
(45) Date of Patent: Feb. 18, 2014

(54) POLYAMIDE COMPOUND

(75) Inventors: Takafumi Oda, Kanagawa (JP); Ryoji Otaki, Kanagawa (JP); Tsuneaki Masuda, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/641,997

(22) PCT Filed: Feb. 23, 2011

(86) PCT No.: PCT/JP2011/053918
§ 371 (c)(1),
(2), (4) Date: Oct. 18, 2012

(87) PCT Pub. No.: WO2011/132456
PCT Pub. Date: Oct. 27, 2011

(65) Prior Publication Data
US 2013/0041128 A1    Feb. 14, 2013

(30) Foreign Application Priority Data

Apr. 20, 2010 (JP) ................................. 2010-097111
Jun. 9, 2010 (JP) ................................. 2010-132007
Jun. 17, 2010 (JP) ................................. 2010-138120

(51) Int. Cl.
    *C08G 69/36* (2006.01)
(52) U.S. Cl.
    USPC ............................ 528/330; 528/328; 528/331
(58) Field of Classification Search
    None
    See application file for complete search history.

(56) References Cited

U.S. PATENT DOCUMENTS

| 4,429,109 | A * | 1/1984 | Curatolo et al. .............. 528/331 |
| 2002/0040087 | A1 | 4/2002 | Yamamoto et al. |
| 2011/0111154 | A1 * | 5/2011 | Le et al. ....................... 428/36.9 |
| 2012/0302723 | A1 | 11/2012 | Oda et al. |

FOREIGN PATENT DOCUMENTS

| JP | 2 72851 | 3/1990 |
| JP | 4 90848 | 3/1992 |
| JP | 2991437 | 12/1999 |
| JP | 2002 138198 | 5/2002 |

OTHER PUBLICATIONS

Wang, L.; Wang, Y.; Cao, D. "Synthesis and Characterization of Novel Biodegradable Polyamides Containing alpha-amino Acid" in J. Macromolecular Sci. Part A. (2009) 46, 312-320.*
Nagata, M. "Synthesis, Characterization, and Degradation of alpha-Amino acid Containing Polyamides" in J. App. Polym. Sci. 69, 417-420 (1998).*
U.S. Appl. No. 13/699,678, filed Nov. 23, 2012, Oda, et al.
U.S. Appl. No. 13/807,169, filed Dec. 27, 2012, Oda, et al.
U.S. Appl. No. 13/997,809, filed Jun. 25, 2013, Oda, et al.
International Search Report Issued May 24, 2011 in PCT/JP11/53918 Filed Feb. 23, 2011.

* cited by examiner

*Primary Examiner* — Randy Gulakowski
*Assistant Examiner* — Christina Wales
(74) *Attorney, Agent, or Firm* — Oblon, Spivak, McClelland, Maier & Neustadt, L.L.P.

(57) ABSTRACT

A polyamide compound containing from 25 to 50 mol % of a diamine unit that contains at least 50 mol % of an alicyclic diamine unit represented by the following general formula (I); from 25 to 50 mol % of a dicarboxylic acid unit that contains a linear aliphatic dicarboxylic acid unit represented by the following general formula (II-1) and/or an aromatic dicarboxylic acid unit represented by the following general formula (II-2) in an amount of at least 50 mol % in total; and from 0.1 to 50 mol % of a constituent unit represented by the following general formula (III):

[Chemical Formula 1]
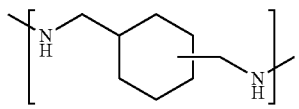 (I)
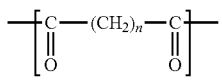 (II-1)
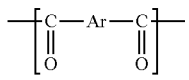 (II-2)
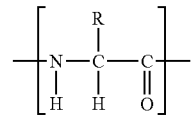 (III)
wherein, in the formulae, n indicates an integer of from 2 to 18; Ar represents an arylene group; and R represents a substituted or unsubstituted alkyl group, or a substituted or unsubstituted aryl group.
19 Claims, 2 Drawing Sheets

POLYAMIDE COMPOUND

TECHNICAL FIELD

The present invention relates to a polyamide compound (including polyamide resin and polyamide oligomer) capable of expressing oxygen absorption performance, and to a polyamide composition containing the polyamide compound.

BACKGROUND ART

Heretofore, metal cans, glass bottles, or containers or shapes of thermoplastic resin and the like are used as packaging materials for drugs, drinks, foods, chemicals, etc. Above all, containers and shapes of thermoplastic resin excel any others in their lightweightness, formability, packages producibility such as sealability, and cost, and are used most popularly. However, in general, containers and shapes of thermoplastic resin are excellent as packaging materials but have some problems in point of their storability for the contents therein since oxygen penetration through the container wall thereof occurs on a non-negligible order level.

For preventing oxygen penetration from the outside thereof, the containers and the shapes of thermoplastic resin are so planned that the container wall could have a multilayer structure, at least one layer of which is an oxygen barrier layer of polymetaxylylenadipamide (hereinafter referred to as "N-MXD6"), ethylene/vinyl alcohol copolymer, polyacrylonitrile, aluminium foil or the like. However, it is still impossible to fully prevent even slight oxygen from penetrating into the containers from outside, and is also impossible to prevent the contents sensible to oxygen such as beer or the like from being deteriorated by oxygen remaining in the containers.

For removing oxygen from containers, an oxygen absorbent has been used in the past. For example, PTLs 1 and 2 describe an oxygen-absorbing multilayer structure and an oxygen-absorbing film with an oxygen absorbent such as iron powder or the like dispersed in resin. PTL 3 describes an oxygen-collecting barrier for packaging capable of absorbing oxygen inside and outside a container formed of a polymer material such as polyamide or the like with a metallic catalyst such as cobalt or the like added thereto. PTL 4 describes a product having an oxygen-scavenging layer that contains an ethylenic unsaturated compound such as polybutadiene or the like and a transition metal catalyst such as cobalt or the like, and an oxygen-blocking layer of polyamide or the like.

CITATION LIST

Patent Literature

PTL 1: JP-A 2-72851
PTL 2: JP-A 4-90848
PTL 3: Japanese Patent 2991437
PTL 4: JP-A 5-115776

SUMMARY OF INVENTION

Technical Problem

The oxygen-absorbing multilayer structure and the oxygen-absorbing film with an oxygen absorbent such as iron powder or the like dispersed in resin are nontransparent since the resin is colored with the oxygen absorbent such as iron powder or the like therein, and are therefore constrained in point of the use thereof in that they could not be used in the field of packaging that requires transparency.

On the other hand, the oxygen-trapping resin composition that contains a transition metal such as cobalt or the like is advantageous in that it is applicable also to packaging containers that require transparency, but is unfavorable since the resin composition is colored by the transition metal catalyst. In addition, in the resin composition, the resin absorbs oxygen and is thereby oxidized in the presence of the transition metal catalyst. Concretely, there would occur various reactions of radical generation to be caused by hydrogen atom drawing away from the methylene chain adjacent to the arylene group in the polyamide resin, peroxy radical generation to be caused by oxygen molecule addition to the radical, and hydrogen atom drawing to be caused by the peroxy radical. Since the resin is oxidized through oxygen absorption of the mechanism as above, there occur various problems in that a decomposed product is generated to give an unfavorable odor to the contents in the containers, and the resin is deteriorated through oxidation to thereby discolor the containers or lower the strength of the containers.

Objects of the present invention are to provide a polyamide compound and a polyamide composition, which can express sufficient oxygen absorption performance even though not containing a metal, which do not generate any offensive odor and which have an extremely good transparency.

Solution to Problem

The present invention provides a polyamide compound and a polyamide composition mentioned below.

<1> A polyamide compound containing from 25 to 50 mol % of a diamine unit that contains at least 50 mol % of an alicyclic diamine unit represented by the following general formula (I), from 25 to 50 mol % of a dicarboxylic acid unit that contains a linear aliphatic dicarboxylic acid unit represented by the following general formula (II-1) and/or an aromatic dicarboxylic acid unit represented by the following general formula (II-2) in an amount of at least 50 mol % in total, and from 0.1 to 50 mol % of a constituent unit represented by the following general formula (III):

[Chemical Formula 1]

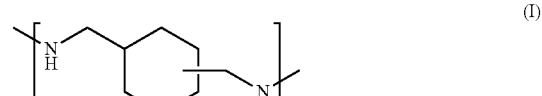

(I)

(II-1)

(II-2)

(III)

[In the general formula (II-1), n indicates an integer of from 2 to 18. In the general formula (II-2), Ar represents an arylene group. In the general formula (III), R represents a substituted or unsubstituted alkyl group, or a substituted or unsubstituted aryl group.]

<2> A polyamide composition containing the polyamide compound of the above <1>.

Advantageous Effects of Invention

The polyamide compound and the polyamide composition of the present invention are excellent in oxygen absorption performance. Accordingly, for example, the polyamide compound and the polyamide composition of the present invention are favorable for use as an oxygen absorbent, as capable of being filled in pouches or the like. A more preferred embodiment of using the polyamide compound and the polyamide composition of the present invention is using them in packaging materials and packaging containers. The packaging materials and packaging containers using the polyamide compound or the polyamide composition of the present invention can express sufficient oxygen absorption performance even though not containing a metal, do not generate any offensive odor, can have an extremely good transparency and can store the contents therein in a good condition.

DESCRIPTION OF EMBODIMENTS

1. Polyamide Compound

Figure 1:
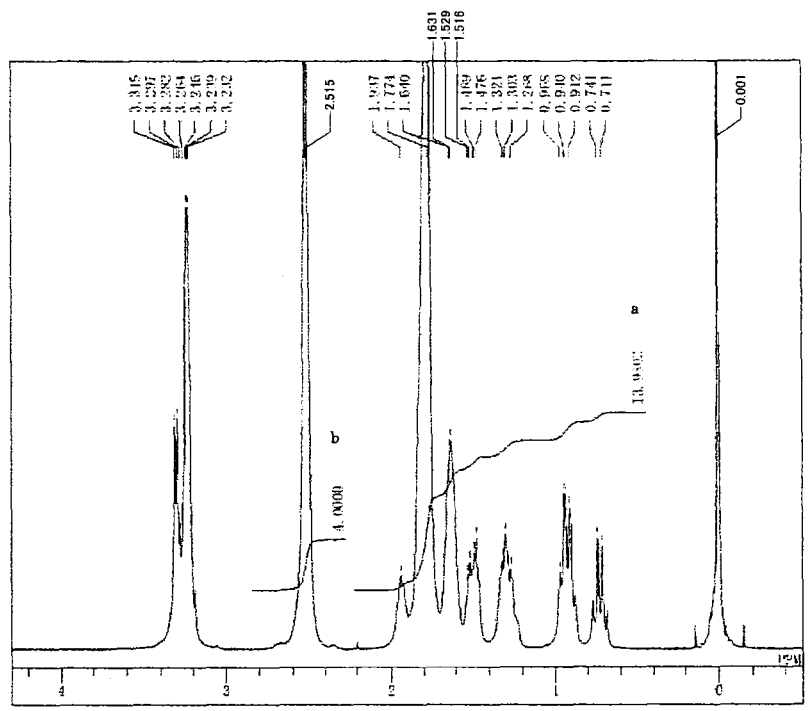
[FIG. 1] This is a $^1$H-NMR chart of poly(cyclohexane-1, 3-dimethylene)adipamide.

The polyamide compound of the present invention contains from 25 to 50 mol % of a diamine unit that contains at least 50 mol % of an alicyclic diamine unit represented by the following general formula (I), from 25 to 50 mol % of a dicarboxylic acid unit that contains a linear aliphatic dicarboxylic acid unit represented by the following general formula (II-1) and/or an aromatic dicarboxylic acid unit represented by the following general formula (II-2) in an amount of at least 50 mol % in total, and from 0.1 to 50 mol % of a tertiary hydrogen-containing carboxylic acid unit (preferably a constituent unit represented by the following general formula (III)):

[Chemical Formula 2]

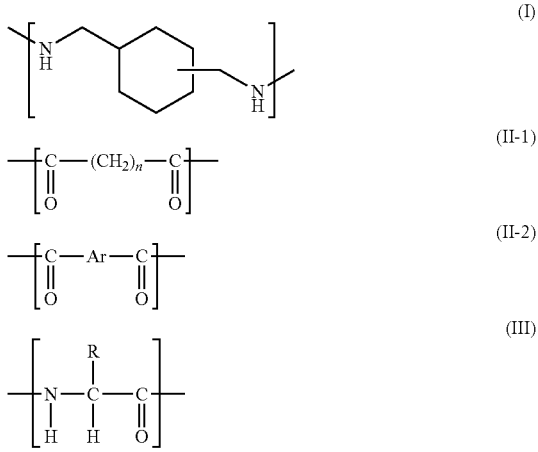

[In the general formula (II-1), n indicates an integer of from 2 to 18. In the general formula (II-2), Ar represents an arylene group. In the general formula (III), R represents a substituted or unsubstituted alkyl group, or a substituted or unsubstituted aryl group.]

However, the total of the diamine unit, the dicarboxylic acid unit and the tertiary hydrogen-containing carboxylic acid unit should not exceed 100 mol %. The polyamide compound of the present invention may contain any other constituent unit within a range not detracting from the advantage of the present invention.

The polyamide compound of the present invention includes a polyamide resin and a polyamide oligomer.

The "polyamide resin" of the present invention means a polymer having a relative viscosity of at least 1.8 of the polyamide compound of the present invention. The polyamide resin is a material capable of being worked and formed by itself, and can be worked and formed into packaging materials and packaging containers. If desired, any other resin and additive may be added to and mixed in the polyamide resin of the present invention, and the polyamide composition thus obtained can be worked and formed. The polyamide resin of the present invention can express sufficient oxygen absorption performance even though not containing a metal, and does not generate any offensive odor, and can have an extremely good transparency.

The "polyamide oligomer" of the present invention means a polymer having a relative viscosity of less than 1.8 of the polyamide compound of the present invention. The polyamide oligomer is a material that cannot be worked and formed by itself. In many cases in general, an oligomer indicates a polymer having a number-average molecular weight of at most 1000, but the polyamide oligomer of the present invention includes not only such an ordinary oligomer but also a polymer having a number-average molecular weight of less than 10000.

The polyamide oligomer of the present invention is favorable for use as an oxygen absorbent, as capable of being filled in pouches or the like. In addition, the polyamide oligomer of the present invention is favorably used as a resin material or a resin additive. In case where the polyamide oligomer of the present invention is used as a resin material, the polyamide oligomer may be copolymerized with any other resin material to give a copolymer resin, and the copolymer resin may be worked and formed into packaging materials or packaging containers. In case where the polyamide oligomer of the present invention is used as a resin additive, the polyamide oligomer may be added to a resin to give a polyamide composition, which may be worked and formed into packaging materials or packaging containers. In this case, the polyamide oligomer can express sufficient oxygen absorption performance not detracting from the transparency and the mechanical strength of the resin. The copolymer resin or the polyamide composition obtained by the use of the polyamide oligomer of the present invention can express sufficient oxygen absorption performance even though not containing a metal, and does not generate any offensive odor.

In the polyamide compound of the present invention, the content of the tertiary hydrogen-containing carboxylic acid unit is from 0.1 to 50 mol %. When the content of the tertiary hydrogen-containing carboxylic acid unit is less than 0.1 mol %, then the compound could not express sufficient oxygen absorption performance. On the other hand, when the content of the tertiary hydrogen-containing carboxylic acid unit is more than 50 mol %, then the tertiary hydrogen content is too high, and if so, the physical properties such as the gas barrier property and the mechanical properties of the polyamide compound may worsen; and in particular, when the tertiary hydrogen-containing carboxylic acid is an amino acid, then not only the heat resistance of the compound is poor since peptide bonds continue therein but also a cyclic product of a dimer of the amino acid is formed to interfere with polymerization. From the viewpoint of the oxygen absorption performance and other properties of the polyamide compound, the content of the tertiary hydrogen-containing carboxylic acid unit is preferably at least 0.2 mol %, more preferably at least 1 mol %, and is preferably at most 40 mol %, even more preferably at most 30 mol %.

In the polyamide compound of the present invention, the diamine unit content is from 25 to 50 mol %, and from the viewpoint of the oxygen absorption performance and the polymer properties of the compound, the content is preferably from 30 to 50 mol %. Similarly, in the polyamide compound of the present invention, the dicarboxylic acid unit content is from 25 to 50 mol %, preferably from 30 to 50 mol %.

Regarding the ratio of the diamine unit content to the dicarboxylic acid unit content, preferably, the two are nearly in the same amount from the viewpoint of the polymerization reaction thereof. More preferably, the dicarboxylic acid unit content is ±2 mol % of the diamine unit content. When the dicarboxylic acid unit content is more than ±2 mol % of the diamine unit content, then the degree of polymerization of the polyamide compound could hardly increase and therefore more time is needed for increasing the degree of polymerization thereof, therefore often causing thermal degradation of the compound.

1-1. Diamine Unit

The diamine unit in the polyamide compound of the present invention contains the alicyclic diamine unit represented by the general formula (I) in an amount of at least 50 mol % of the diamine unit, from the viewpoint of making the polyamide compound have an excellent gas barrier property and, in addition, from the viewpoint of enhancing the transparency and the discoloration resistance of the compound and facilitating the formability thereof; and the content is preferably at least 70 mol %, more preferably at least 80 mol %, even more preferably at least 90 mol %, but is preferably at most 100 mol %.

The compound capable of constituting the alicyclic diamine unit represented by the general formula (I) includes bis(aminomethyl)cyclohexanes such as 1,3-bis(aminomethyl)cyclohexane, 1,4-bis(aminomethyl)cyclohexane, etc. One alone or two or more of these may be used here either singly or as combined.

Bis(aminomethyl)cyclohexanes have structural isomers. Those having a higher cis-form ratio give good shapes having high crystallinity. On the other hand, those having a lower cis-form ratio give transparent shapes having low crystallinity. Accordingly, in case where the intended shapes are desired to have a high crystallinity, the cis-form content ratio in the bis(aminomethyl)cyclohexanes is preferably at least 70 mol %, more preferably at least 80 mol %, even more preferably at least 90 mol %. On the other hand, when the shapes are desired to have a low crystallinity, then the cis-form content ratio in the bis(aminomethyl)cyclohexanes is preferably at most 50 mol %, more preferably at most 40 mol %, even more preferably at most 30 mol %.

The compound capable of constituting the other diamine unit than the alicyclic diamine unit represented by the general formula (I) includes paraphenylenediamine, 1,3-diaminocyclohexane, 1,4-diaminocyclohexane, tetramethylenediamine, pentamethylenediamine, hexamethylenediamine, octamethylenediamine, nonamethylenediamine, 2-methyl-1,5-pentanediamine, 1-amino-3-aminomethyl-3,5,5-trimethylcyclohexane, orthoxylenediamine, methaxylenediamine, paraxylenediamine, and ether bond—having polyether diamines such as typically Huntsman's Jeffamine and Elastamine (both trade names), etc., to which, however, the present invention is not limited. One alone or two or more different types of these may be used here either singly or as combined.

1-2. Dicarboxylic Acid Unit

The dicarboxylic acid unit in the polyamide compound of the present invention contains the linear aliphatic dicarboxylic acid unit represented by the general formula (II-1) and/or the aromatic dicarboxylic acid unit represented by the general formula (II-2) in an amount of at least 50 mol % in total in the dicarboxylic acid unit, from the viewpoint of the reactivity in polymerization and the crystallinity and the formability of the polyamide compound; and the content is preferably at least 70 mol %, more preferably at least 80 mol %, even more preferably at least 90 mol %, but is preferably at most 100 mol %.

The compound capable of constituting the other dicarboxylic acid unit than the dicarboxylic acid unit represented by the general formula (II-1) or (II-2) includes dicarboxylic acids such as oxalic acid, malonic acid, fumaric acid, maleic acid, 1,3-benzene-diacetic acid, 1,4-benzene-diacetic acid, etc., to which, however, the present invention is not limited.

In the dicarboxylic acid unit in the polyamide compound of the present invention, the content ratio of the linear aliphatic dicarboxylic acid unit to the aromatic dicarboxylic acid unit (linear aliphatic dicarboxylic acid unit/aromatic dicarboxylic acid unit) is not specifically defined, and may be suitably determined depending on the intended use. For example, in case where the glass transition temperature of the polyamide compound is desired to be elevated and the crystallinity of the polyamide compound is thereby desired to be lowered, the ratio of linear aliphatic dicarboxylic acid unit/aromatic dicarboxylic acid unit is preferably from 0/100 to 60/40 relative to the total of the two, 100, and is more preferably from 0/100 to 40/60, even more preferably from 0/100 to 30/70. In case where the glass transition temperature of the polyamide compound is desired to be lowered and the polyamide compound is thereby desired to be more flexible, then the ratio of linear aliphatic dicarboxylic acid unit/aromatic dicarboxylic acid unit is preferably from 40/60 to 100/0 relative to the total of the two, 100, and is more preferably from 60/40 to 100/0, even more preferably from 70/30 to 100/0.

1-2-1. Linear Aliphatic Dicarboxylic Acid Unit

In case where the polyamide compound of the present invention is desired to have a suitable glass transition temperature and suitable crystallinity, and in addition thereto, the compound is further desired to have suitable flexibility necessary for packaging materials and packaging containers, then the compound preferably contains the linear aliphatic dicarboxylic acid unit represented by the general formula (II-1).

In the general formula (II-1), n indicates an integer of from 2 to 18, preferably from 3 to 16, more preferably from 4 to 12, even more preferably from 4 to 8.

The compound capable of constituting the linear aliphatic dicarboxylic acid unit represented by the general formula (II-1) includes succinic acid, glutaric acid, adipic acid, pimelic acid, suberic acid, azelaic acid, sebacic acid, 1,10-decanedicarboxylic acid, 1,11-undecanedicarboxylic acid, 1,12-dodecanedicarboxylic acid, etc., to which, however, the present invention is not limited. One alone or two or more of these may be used here either singly or as combined.

The type of the linear aliphatic dicarboxylic acid unit represented by the general formula (II-1) can be suitably determined depending on the intended use thereof. The linear aliphatic dicarboxylic acid unit in the polyamide compound of the present invention preferably contains at least one selected from the group consisting of an adipic acid unit, a sebacic acid unit and a 1,12-dodecanedicarboxylic acid unit in an amount of 50 mol % in total in the linear aliphatic dicarboxylic acid unit, from the viewpoint of giving an excellent gas barrier property to the polyamide compound and, in addition thereto, from the viewpoint that the packaging materials and the packaging containers using the polyamide compound can still keep heat resistance after thermal sterilization thereof; and the content is more preferably at least 70 mol %, even more preferably at least 80 mol %, still more preferably at least 90 mol %, but is preferably at most 100 mol %.

The linear aliphatic dicarboxylic acid unit in the polyamide compound of the present invention preferably contains an adipic acid unit in an amount of at least 50 mol % in the linear aliphatic dicarboxylic acid unit from the viewpoint of the gas barrier property of the polyamide compound and of suitable thermal properties such as suitable glass transition temperature or melting point thereof. The linear aliphatic dicarboxylic acid unit in the polyamide compound of the present invention preferably contains a sebacic acid unit in an amount of at least 50 mol % in the linear aliphatic dicarboxylic acid unit from the viewpoint of giving suitable gas barrier property and forming workability to the polyamide compound; and in case where the polyamide compound is used for those that are required to have low water absorbability, weatherability and heat resistance, the linear aliphatic dicarboxylic acid unit preferably contains a 1,12-dodecanedicarboxylic acid unit in an amount of at least 50 mol % therein.

1-2-2. Aromatic Dicarboxylic Acid Unit

The polyamide compound of the present invention preferably contains the aromatic dicarboxylic acid unit represented by the general formula (II-2) in order that the polyamide compound is given a better gas barrier property and, in addition thereto, in order that the compound could easily worked and formed into packaging materials and packaging containers.

In the general formula (II-2), Ar represents an arylene group. The arylene group is preferably an arylene group having from 6 to 30 carbon atoms, more preferably from 6 to 15 carbon atoms, including, for example, a phenylene group, a naphthylene group, etc.

The compound capable of constituting the aromatic dicarboxylic acid unit represented by the general formula (II-2) includes terephthalic acid, isophthalic acid, 2,6-naphthalenedicarboxylic acid, etc., to which, however, the present invention is not limited. One alone or two or more of these can be used here either singly or as combined.

The type of the aromatic dicarboxylic acid unit represented by the general formula (II-2) can be suitably determined depending on the intended use thereof. The aromatic dicarboxylic acid unit in the polyamide compound of the present invention preferably contains at least one selected from the group consisting of an isophthalic acid unit, a terephthalic acid unit and a 2,6-naphthalenedicarboxylic acid unit in an amount of 50 mol % in total in the aromatic dicarboxylic acid unit; and the content is more preferably at least 70 mol %, even more preferably at least 80 mol %, still more preferably at least 90 mol %, but is preferably at most 100 mol %. Of those, isophthalic acid and/or terephthalic acid are more preferably contained in the aromatic dicarboxylic acid unit. The content ratio of the isophthalic acid unit to the terephthalic acid unit (isophthalic acid unit/terephthalic acid unit) is not specifically defined, and may be suitably determined depending on the intended use. For example, from the viewpoint of suitably lowering the glass transition temperature and the crystallinity, the ratio is preferably from 0/100 to 100/0 relative to the total of the two units, 100, more preferably from 0/100 to 60/40, even more preferably from 0/100 to 40/60, still more preferably from 0/100 to 30/70.

1-3. Tertiary Hydrogen-Containing Carboxylic Acid Unit

The tertiary hydrogen-containing carboxylic acid unit in the present invention has at least one amino group and at least one carboxyl group or has at least two carboxyl groups from the viewpoint of polymerization of the polyamide compound. As specific examples, there are mentioned constituent units represented by any of the following general formulae (III), (IV) or (V):

[Chemical Formula 3]

(III)

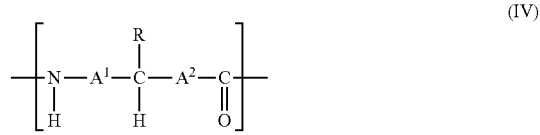

(IV)

(V)

[In the general formula (III) to (V), R, $R^1$ and $R^2$ each represent a substituent, and $A^1$ to $A^3$ each represent a single bond or a divalent linking group. However, the general formula (IV) excludes a case where $A^1$ and $A^2$ are both single bonds.]

The polyamide compound of the present invention contains a tertiary hydrogen-containing carboxylic acid unit. Containing such a tertiary hydrogen-containing carboxylic acid unit as the copolymerization component thereof, the polyamide compound of the present invention can exhibit excellent oxygen absorption performance even though not containing a transition metal.

In the present invention, the mechanism that the polyamide compound having a tertiary hydrogen-containing carboxylic acid unit could realize good oxygen absorption performance would be, though not clarified as yet, considered as follows: In the compound capable of constituting a tertiary hydrogen-containing carboxylic acid unit, an electron-attracting group and an electron-donating group bond to one and the same carbon atom, and therefore, owing to the phenomenon that is called a captodative effect of energically stabilizing the unpaired electrons existing on that carbon atoms, an extremely stable radical could be formed. Specifically, a carboxyl group is an electron-attracting group, and since the carbon atom adjacent to the group, to which a tertiary hydrogen atom bonds, is an electron-poor ($\delta^+$) one, the tertiary hydrogen atom also becomes an electron-poor ($\delta^+$) one, therefore forming a radical as dissociated as a proton. In case where oxygen and water exists in this state, oxygen could react with the radical and therefore the compound could exhibit oxygen absorption performance. In this connection, it has been known that in an environment having a higher humidity and a higher temperature, the reactivity is higher.

In the general formulae (III) to (V), R, $R^1$ and $R^2$ each represent a substituent. The substituent represented by R, $R^1$ and $R^2$ in the present invention includes a halogen atom (e.g., a chlorine atom, a bromine atom, an iodine atom), an alkyl group (a linear, branched or cyclic alkyl group having from 1 to 15, preferably from 1 to 6 carbon atoms, for example, a methyl group, an ethyl group, a n-propyl group, an isopropyl group, a t-butyl group, a n-octyl group, a 2-ethylhexyl group, a cyclopropyl group, a cyclopentyl group), an alkenyl group (a linear, branched or cyclic alkenyl group having from 2 to 10, preferably from 2 to 6 carbon atoms, for example, a vinyl group, an allyl group), an alkynyl group (an alkynyl group having from 2 to 10, preferably from 2 to 6 carbon atoms, for example, an ethynyl group, a propargyl group), an aryl group (an aryl group having from 6 to 16, preferably from 6 to 10 carbon atoms, for example, a phenyl group, a naphthyl group), a heterocyclic group (a monovalent group having from 1 to 12, preferably from 2 to 6 carbon atoms, as derived from a 5-membered or 6-membered, aromatic or non-aromatic heterocyclic compound by removing one hydrogen atom therefrom, for example, a 1-pyrazolyl group, a 1-imidazolyl group, a 2-furyl group), a cyano group, a hydroxyl group, a nitro group, an alkoxy group (a linear, branched or cyclic alkoxy group having from 1 to 10, preferably from 1 to 6 carbon atoms, for example, a methoxy group, an ethoxy group), an aryloxy group (an aryloxy group having from 6 to 12, preferably from 6 to 8 carbon atoms, for example, a phenoxy group), an acyl group (a formyl group, an alkylcarbonyl group having from 2 to 10, preferably from 2 to 6 carbon atoms, or an arylcarbonyl group having from 7 to 12, preferably from 7 to 9 carbon atoms, for example, an acetyl group, a pivaloyl group, a benzoyl group), an amino group (an amino group, an alkylamino group having from 1 to 10, preferably from 1 to 6 carbon atoms, an anilino group having from 6 to 12, preferably from 6 to 8 carbon atoms, or a heterocyclic amino group having from 1 to 12, preferably from 2 to 6 carbon atoms, for example, an amino group, a methylamino group, an aniline group), a mercapto group, an alkylthio group (an alkylthio group having from 1 to 10, preferably from 1 to 6 carbon atoms, for example, a methylthio group, an ethylthio group), an arylthio group (an arylthio group having from 6 to 12, preferably from 6 to 8 carbon atoms, for example, a phenylthio group), a heterocyclic thio group (a heterocyclic thio group having from 2 to 10, preferably from 1 to 6 carbon atoms, for example, a 2-benzothiazolylthio group), an imido group (an imido group having from 2 to 10, preferably from 4 to 8 carbon atoms, for example, an N-succinimido group, an N-phthalimido group), etc.

Of the functional groups, those having a hydrogen atom may be further substituted with the above-mentioned group. For example, there are mentioned an alkyl group substituted with a hydroxyl group (e.g., a hydroxyethyl group), an alkyl group substituted with an alkoxy group (e.g., a methoxy group), an alkyl group substituted with an aryl group (e.g., a benzyl group), an aryl group substituted with an alkyl group (e.g., a p-tolyl group), an aryloxy group substituted with an alkyl group (e.g., a 2-methylphenoxy group), etc., to which, however, the present invention is not limited.

In case where the functional group is further substituted, the above-mentioned carbon number does not include the carbon number of the additional substituent. For example, a benzyl group is considered as an alkyl group having 1 carbon atom and substituted with a phenyl group, but is not considered as an alkyl group substituted with a phenyl group and having 7 carbon atoms. Unless otherwise specifically indicated, the same shall apply to the carbon number referred to hereinunder.

In the general formulae (IV) and (V), $A^1$ to $A^3$ each represent a single bond or a divalent linking group. However, the general formula (IV) excludes a case where $A^1$ and $A^2$ are both single bonds. The divalent linking group includes, for example, a linear, branched or cyclic alkylene group (an alkylene group having from 1 to 12, preferably from 1 to 4 carbon atoms, for example, a methylene group, an ethylene group), an aralkylene group (an aralkylene group having from 7 to 30, preferably from 7 to 13 carbon atoms, for example, a benzylidene group), an arylene group (an arylene group having from 6 to 30, preferably from 6 to 15 carbon atoms, for example, a phenylene group), etc. These may further have a substituent. The substituent may include the functional groups exemplified hereinabove for the substituents represented by R, $R^1$ and $R^2$. For example, there are mentioned an arylene group substituted with an alkyl group (for example, a xylylene group), etc., to which, however, the present invention is not limited.

Preferably, the polyamide compound of the present invention contains at least one of the constituent units represented by any of the general formula (III), (IV) or (V). Of those, more preferred is a carboxylic acid unit having a tertiary hydrogen atom at the α carbon atom (carbon atom adjacent to the carboxyl group), from the viewpoint of the availability of the starting material and of the advanced oxygen absorbability of the compound; and more preferred is the constituent unit represented by the general formula (III).

R in the general formula (III) is as mentioned above. Above all, more preferred are a substituted or unsubstituted alkyl group and a substituted or unsubstituted aryl group; even more preferred are a substituted or unsubstituted alkyl group having from 1 to 6 carbon atoms, and a substituted or unsubstituted aryl group having from 6 to 10 carbon atoms; and still more preferred are a substituted or unsubstituted alkyl group having from 1 to 4 carbon atoms, and a substituted or unsubstituted phenyl group.

Preferred examples of R include a methyl group, an ethyl group, an n-propyl group, an isopropyl group, an n-butyl group, a t-butyl group, a 1-methylpropyl group, a 2-methylpropyl group, a hydroxymethyl group, a 1-hydroxyethyl group, a mercaptomethyl group, a methylsulfanylethyl group, a phenyl group, a naphthyl group, a benzyl group, a 4-hydroxybenzyl group, etc., to which, however, the present invention is not limited. Of those, more preferred are a methyl group, an ethyl group, a 2-methylpropyl group and a benzyl group.

The compound capable of constituting the constituent unit represented by the general formula (III) includes α-amino acids such as alanine, 2-aminobutyric acid, valine, norvaline, leucine, norleucine, tert-leucine, isoleucine, serine, threonine, cysteine, methionine, 2-phenylglycine, phenylalanine, tyrosine, histidine, tryptophane, proline, etc., to which, however, the present invention is not limited.

The compound capable of constituting the constituent unit represented by the general formula (IV) includes β-amino acids such as 3-aminobutyric acid, etc.; and the compound capable of constituting the constituent unit represented by the general formula (V) include dicarboxylic acids such as methylmalonic acid, methylsuccinic acid, malic acid, tartaric acid, etc., to which, however, the invention is not limited.

These may be any of a D-form, an L-form or a racemic form, and may also be an allo-form. One alone or two or more of these may be used here either singly or as combined.

Of those, more preferred is an α-amino acid having a tertiary hydrogen atom at the α carbon atom, from the viewpoint of the availability of the starting material and of the advanced oxygen absorbability of the compound. Of the α-amino acid, most preferred is alanine from the viewpoint of the availability, the cost and the polymerizability thereof and of the low yellow index (YI) of the polymer. Alanine has a relatively low molecular weight, and the copolymerization ratio thereof per gram of the polyamide compound of the present invention is therefore high, and accordingly, the oxygen absorption performance per gram of the polyamide compound with alanine is good.

The purity of the compound capable of constituting the tertiary hydrogen-containing carboxylic acid unit is preferably at least 95%, from the viewpoint of the influence thereof on the polymerization such as delay in polymerization rate thereof as well as on the quality such as the yellow index of the polymer, more preferably at least 98.5%, even more preferably at least 99%. The amount of sulfate ion and ammonium ion to be contained in the compound as impurities therein is preferably at most 500 ppm, more preferably at most 200 ppm, even more preferably at most 50 ppm.

1-4. ω-Aminocarboxylic Acid Unit

In case where the polyamide compound of the present invention is needed to have flexibility, the polyamide compound may further contain an ω-aminocarboxylic acid unit represented by the following general formula (A), in addition to the above-mentioned diamine unit, dicarboxylic acid unit and tertiary hydrogen-containing carboxylic acid unit therein.

[Chemical Formula 4]

(A)

[In the general formula (A), p indicates an integer of from 2 to 18.]

The content of the ω-aminocarboxylic acid unit is preferably from 0.1 to 49.9 mol % in all the constituent units of the polyamide compound, more preferably from 3 to 40 carbon atoms, even more preferably from 5 to 35 mol %. However, the total of the diamine unit, the dicarboxylic acid unit, the tertiary hydrogen-containing carboxylic acid unit and the ω-aminocarboxylic acid unit should not exceed 100 mol %.

In the general formula (A), p indicates an integer of from 2 to 18, preferably from 3 to 16, more preferably from 4 to 14, even more preferably from 5 to 12.

The compound capable of constituting the ω-aminocarboxylic acid unit represented by the general formula (A) includes an ω-aminocarboxylic acid having from 5 to 19 carbon atoms, and a lactam having from 5 to 19 carbon atoms. The ω-aminocarboxylic acid having from 5 to 19 carbon atoms includes 6-aminohexanoic acid, 12-aminododecanoic acid, etc.; and the lactam having from 5 to 19 carbon atoms includes ε-caprolactam and laurolactam, to which, however, the present invention is not limited. One alone or two or more of these may be used here either singly or as combined.

Preferably, the ω-aminocarboxylic acid unit contains a 6-aminohexanoic acid unit and/or a 12-aminododecanoic acid unit in an amount of at least 50 mol % in total in the ω-aminocarboxylic acid unit; and the content is more preferably at least 70 mol %, even more preferably at least 80 mol %, still more preferably at least 90 mol %, and is preferably at most 100 mol %.

1-5. Degree of Polymerization of Polyamide Compound

For the degree of polymerization of the polyamide compound of the present invention, used is a relative viscosity thereof. The relative viscosity of the polyamide compound of the present invention is preferably from 1.01 to 4.2.

In case where the polyamide compound of the present invention is a polyamide resin, the relative viscosity thereof is preferably from 1.8 to 4.2 from the viewpoint of the shapes thereof and of the forming workability thereof, more preferably from 1.9 to 4.0, even more preferably from 2.0 to 3.8. However, in case where the polyamide resin of the present invention is used as an additive, a modifier or the like for other thermoplastic resins, the range should not apply thereto.

In case where the; polyamide compound of the present invention is a polyamide oligomer, the relative viscosity thereof is preferably from 1.01 to less than 1.8 from the viewpoint of the handleability, the reactivity and the thermal stability thereof, more preferably from 1.1 to 1.75, even more preferably from 1.2 to 1.65, still more preferably from 1.3 to 1.6.

The relative viscosity as referred to herein is as follows: One gram of the polyamide compound is dissolved in 100 mL of 96% sulfuric acid, and using a Canon Fenske-type viscometer, the dropping time (t) thereof is measured at 25° C. The dropping time ($t_0$) of 96% sulfuric acid is also measured in the same manner, and the relative viscosity of the compound is represented by the following ratio.

Relative Viscosity=$t/t_0$ 1-6. Terminal Amino Group Concentration

The oxygen absorption rate of the polyamide compound and the oxidative deterioration of the polyamide compound owing to oxygen absorption can be controlled by changing the terminal amino group concentration of the polyamide compound. In case where the polyamide compound is a polyamide resin, the terminal amino group concentration thereof is preferably from 5 to 150 eq/$10^6$ g from the viewpoint of the balance between the oxygen absorption rate and the oxidative deterioration thereof, more preferably from 10 to 100 eq/$10^6$ g, even more preferably from 15 to 80 eq/$10^6$ g.

2. Production Method for Polyamide Compound

The polyamide compound of the present invention can be produced through polycondensation of a diamine component capable of constituting the above-mentioned diamine unit, a dicarboxylic acid component capable of constituting the above-mentioned dicarboxylic acid unit, a tertiary hydrogen-containing carboxylic acid component capable of constituting the above-mentioned tertiary hydrogen-containing carboxylic acid unit, and optionally an ω-aminocarboxylic acid component capable of constituting the above-mentioned ω-aminocarboxylic acid unit, in which the degree of polymerization can be controlled by controlling the polycondensation condition. A small amount of a monoamine or a monocarboxylic acid, serving as a molecular weight regulating agent, may be added to the system during polycondensation. In order to control the polycondensation reaction and to make the produced polymer have a desired degree of polymerization, the ratio (by mol) of the diamine component to the carboxylic acid component to constitute the polyamide compound may be deviated from 1.

The polycondensation method for the polyamide compound of the present invention includes a reactive extrusion method, a pressurized salt method, a normal-pressure dropwise addition method, a pressurized dropwise addition method, etc., to which, however, the invention is not limited. Preferably, the reaction temperature is as low as possible, since the polyamide compound can be prevented from yellowing or gelling and can have stable properties.

2-1. Reactive Extrusion Method

The reactive extrusion method is a method of reacting a polyamide comprising a diamine component and a dicarboxylic acid component (a polyamide corresponding to the precursor of the polyamide compound of the present invention) or a polyamide comprising a diamine component, a dicarboxylic acid component and an ω-aminocarboxylic acid component (a polyamide corresponding to the precursor of the polyamide compound of the present invention) with a tertiary hydrogen-containing carboxylic acid component by melt-kneading them in an extruder. This is a method of incorporating the tertiary hydrogen-containing carboxylic acid component into the skeleton of the polyamide through interamidation reaction. Preferably, a screw suitable to reactive extrusion is used and a double-screw extruder having a large L/D is used for fully attaining the reaction. This method is simple and is favorable for producing a polyamide compound that contains a small amount of a tertiary hydrogen-containing carboxylic acid component.

2-2. Pressurized Salt Method

The pressurized salt method is a method of melt polycondensation under pressure, starting from a nylon salt as the starting material. Concretely, an aqueous solution of a nylon salt comprising a diamine component, a dicarboxylic acid component, a tertiary hydrogen-containing carboxylic acid component and optionally an ω-aminocarboxylic acid component is prepared, and thereafter the aqueous solution is concentrated and heated under pressure for polycondensation with removing the condensation water. Inside the reactor, while the pressure is gradually restored to normal pressure, the system is heated up to around a temperature of (melting point+10° C.) of the polyamide compound and kept as such, and thereafter the inner pressure is gradually reduced to −0.02 MPaG and kept as such at the temperature to continue the polycondensation. After the system has reached a predetermined stirring torque, the reactor was pressurized with nitrogen up to 0.3 MPaG or so and the polyamide compound is then collected.

The pressurized salt method is useful in a case where a volatile component is used as the monomer, and is a preferred polycondensation method for the case where the copolymerization ratio of the tertiary hydrogen-containing carboxylic acid component is high. In particular, the method is favorable for the case where the tertiary hydrogen-containing carboxylic acid component accounts for at least 15 mol % of all the components constituting the polyamide compound. According to the pressurized salt method, the tertiary hydrogen-containing carboxylic acid component can be prevented from evaporating away, and further, polycondensation of the tertiary hydrogen-containing carboxylic acid component alone can be prevented, and accordingly, the polycondensation reaction can be carried out smoothly and the polyamide compound produced can have excellent properties.

2-3. Normal-Pressure Instillation Method

The normal-pressure instillation method is a method where a diamine component is continuously added dropwise to a mixture prepared by heating and melting a dicarboxylic acid component, a tertiary hydrogen-containing carboxylic acid component and optionally an ω-aminocarboxylic acid component, under normal pressure for polycondensation with removing the condensation water. During the polycondensation reaction, the reaction system is heated in order that the reaction temperature is not lower than the melting point of the polyamide compound to be produced.

In the normal-pressure instillation method, the yield per batch is large as compared with that in the pressurized salt method, since the method does not require water for salt dissolution, and in addition, since the method does not require vaporization and condensation of the starting material components, the reaction speed lowers little and the process time can be shortened.

2-4. Pressurized Instillation Method

In the pressurized instillation method, first a dicarboxylic acid component, a tertiary hydrogen-containing carboxylic acid component and optionally an ω-aminocarboxylic acid component are put into the polycondensation reactor, and then the components are stirred and mixed in melt to prepare a mixture. Next, while the reactor is pressurized preferably up to from 0.3 to 0.4 MPaG or so, a diamine component is continuously added dropwise to the mixture for polycondensation with removing the condensation water. During the polycondensation reaction, the reaction system is heated in order that the reaction temperature is not lower than the melting point of the polyamide compound to be produced. After the components have reached a predetermined molar ratio, the addition of the diamine component is finished. While the reactor is gradually restored to normal pressure, the system therein is heated up to around a temperature of (melting point+10° C.) of the polyamide compound to be produced, and kept as such. Subsequently, while the reactor is gradually depressurized to −0.02 MPaG, the system therein is kept as such at the temperature to continue the polycondensation. After the system has reached a predetermined stirring torque, the reactor was pressurized with nitrogen up to 0.3 MPaG or so and the polyamide compound is then collected.

Like the pressurized salt method, the pressurized instillation method is useful in a case where a volatile component is used as the monomer, and is a preferred polycondensation method for the case where the copolymerization ratio of the tertiary hydrogen-containing carboxylic acid component is high. In particular, the method is favorable for the case where the tertiary hydrogen-containing carboxylic acid component accounts for at least 15 mol % of all the components constituting the polyamide compound. According to the pressurized instillation method, the tertiary hydrogen-containing carboxylic acid component can be prevented from evaporating away, and further, polycondensation of the tertiary hydrogen-containing carboxylic acid component alone can be prevented, and accordingly, the polycondensation reaction can be carried out smoothly and the polyamide compound produced can have excellent properties. Further, different from the pressurized salt method, the pressurized instillation method does not require water for salt dissolution and therefore the yield per batch according to the method is large. In addition, in the method, the reaction time can be shortened and therefore the system can be prevented from belling, like in the normal-pressure instillation method. Accordingly, the method produces a polyamide compound having a low yellow index.

2-5. Step of Increasing Degree of Polymerization

The polyamide compound produced according to the above-mentioned polycondensation method can be used directly as it is, however, the compound may be processed in a step of further increasing the degree of polymerization thereof. The step of increasing the degree of polymerization includes reactive extrusion in an extruder, solid-phase polymerization, etc. As the heating apparatus for use for solid-phase polymerization, preferred are a continuous heating and drying apparatus; a rotary drum-type heating apparatus such as a tumble drier, a conical drier, a rotary drier, etc.; and a conical heating apparatus equipped with a rotary blade inside it, such as a Nauta mixer, etc. Not limited to these, any ordinary method and apparatus are usable in the present invention. In particular, for solid-phase polymerization to give the polyamide compound, preferred is use of a rotary drum-type heating apparatus among the above, since the system can be airtightly sealed up and the polycondensation can be readily promoted therein in a condition where oxygen to cause discoloration is eliminated.

2-6. Phosphorus Atom-Containing Compound, Alkali Metal Compound

In polycondensation to produce the polyamide compound of the present invention, preferred is adding a phosphorus atom-containing compound from the viewpoint of promoting the amidation reaction.

The phosphorus atom-containing compound includes phosphinico acid compounds such as dimethylphosphinic acid, phenylmethylphosphinic acid, etc.; hypophosphorous acid compounds such as hypophosphorous acid, sodium hypophosphite, potassium hypophosphite, lithium hypophosphite, magnesium hypophosphite, calcium hypophosphite, ethyl hypophosphite, etc.; phosphonic acid compounds such as phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate, potassium ethylphosphonate, etc.; phosphonous acid compounds such as phosphonous acid, sodium phosphonite, lithium phosphonite, potassium phosphonite, magnesium phosphonite, calcium phosphonite, phenylphosphonous acid, sodium phenylphosphonite, lithium phenylphosphonite, ethyl phenylphosphonite, etc.; phosphorous acid compounds such as phosphorous acid, sodium hydrogen phosphite, sodium phosphite, lithium phosphite, potassium phosphite, magnesium phosphite, calcium phosphite, triethyl phosphite, triphenyl phosphite, pyrophosphorous acid, etc.

Of those, especially preferred for use herein are metal hypophosphites such as sodium hypophosphite, potassium hypophosphite, lithium hypophosphite, etc., as their effect of promoting amidation is high and their effect of preventing discoloration is excellent. In particular, sodium hypophosphite is preferred. However, the phosphorus atom-containing compounds usable in the present invention are not limited to the above.

The amount of the phosphorus atom-containing compound to be added is preferably from 0.1 to 1000 ppm in terms of the phosphorus atom concentration in the polyamide compound, more preferably from 1 to 600 ppm, even more preferably from 5 to 400 ppm. When the amount is at least 0.1 ppm, the polyamide compound is hardly discolored during polymerization and the transparency thereof could be high. When at most 1000 ppm, the polyamide compound hardly gels and, in addition, the shapes of the polyamide compound would have few fish eyes that may be caused by the phosphorus atom-containing compound, and therefore the appearance thereof could be good.

Also preferably, an alkali metal compound is added to the polycondensation system to give the polyamide compound, along with the phosphorus atom-containing compound thereto. A sufficient amount of a phosphorus atom-containing compound must be present in the system in order to prevent the discoloration of the polyamide during polycondensation, which, however, may rather cause gelation of the polyamide compound as the case may be. Therefore, for avoiding the problem and additionally for controlling the amidation reaction speed, it is desirable to add an alkali metal compound to the system along with the phosphorus atom-containing compound thereto.

The alkali metal compound is preferably an alkali metal hydroxide, an alkali metal acetate, alkali metal carbonate, alkali metal alkoxides, etc. Specific examples of the alkali metal compound usable in the present invention include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide, sodium carbonate, etc., to which, however, the present invention is not limited. The ratio (by mol) of the phosphorus atom-containing compound to the alkali metal compound, phosphorus atom-containing compound/alkali metal compound is preferably within a range of from 1.0/0.05 to 1/0/1.5, from the viewpoint of controlling the polymerization speed and reducing the yellow index, more preferably from 1.0/0.1 to 1.0/1.2, even more preferably from 1.0/0.2 to 1.0/1.1.

3. Polyamide Composition

The polyamide composition of the present invention is a composition containing the polyamide compound of the present invention. The polyamide composition of the present invention is a mixture to be obtained by adding various additives and various resins to the polyamide resin or the polyamide oligomer of the present invention followed by mixing them, and in the mixture, the polyamide resin or the polyamide oligomer may react with the additives and the resins added thereto.

3-1. Additive

Depending on the desired use and performance, additives such as lubricant, crystallization nucleating agent, whitening inhibitor, delustering agent, heat-resistant stabilizer, weather-resistant stabilizer, UV absorbent, plasticizer, flame retardant, antistatic agent, discoloration inhibitor, antioxidant, impact resistance improver, etc., may be added to the polyamide composition of the present invention to give a polyamide composition. These additives may be optionally added thereto within a range not detracting from the advantage of the present invention.

The polyamide compound of the present invention may be mixed with the additives in any heretofore known method, for which, however, preferred is inexpensive dry mixing that hardly receives thermal history. For example, there is mentioned a method where the polyamide compound and the above-mentioned additives are added to a tumbler and mixed therein by rotating the tumbler. In the present invention, also employable is a method where a viscous liquid is adhered to the polyamide compound as a spreading agent and thereafter the additives are added to and mixed with the compound, for preventing the polyamide compound and the additives from separating after mixing in dry. As the spreading agent, there are mentioned surfactants, etc.; however, not limited thereto, any known one is employable in the present invention.

3-1-1. Whitening Inhibitor

In the polyamide composition of the present invention, preferably, a diamide compound and/or a diester compound are added to the polyamide compound for preventing the composition from whitening after hot water treatment or after long-term aging. The diamide compound and/or the diester compound are effective for preventing whitening due to oligomer precipitation. The diamide compound and the diester compound may be used alone, or may be used as combined.

The diamide compound for use in the present invention is preferably a diamide compound obtained from an aliphatic dicarboxylic acid having from 8 to 30 carbon atoms and a diamine having from 2 to 10 carbon atoms. An aliphatic dicarboxylic acid having at least 8 carbon atoms and a diamine having at least two carbon atoms are expected to realize the whitening-preventing effect. On the other hand, an aliphatic dicarboxylic acid having at most 30 carbon atoms and a diamine having at most 10 carbon atoms may give a diamide compound well and uniformly dispersible in the polyamide composition. The aliphatic dicarboxylic acid may have a side chain or a double bond, but a linear saturated aliphatic dicarboxylic acid is preferred for use herein. One alone or two or more different types of such diamide compounds may be used here either singly or as combined.

The aliphatic dicarboxylic acid includes stearic acid (C18), eicosanoic acid (C20), behenic acid (C22), montanic acid (C28), triacontanoic acid (C30), etc. The diamine includes ethylenediamine, butylenediamine, hexanediamine, xylylenediamine, bis(aminomethyl)cyclohexane, etc. Diamide compounds to be obtained by combining these are preferred here.

Preferred is a diamide compound to be obtained from an aliphatic dicarboxylic acid having from 8 to 30 carbon atoms and a diamine mainly comprising ethylenediamine, or a diamide compound to be obtained from an aliphatic dicarboxylic acid mainly comprising montanic acid and a diamine having from 2 to 10 carbon atoms; and more preferred is a diamide compound to be obtained from an aliphatic dicarboxylic acid mainly comprising stearic acid and a diamine mainly comprising ethylenediamine.

As the diester compound for use in the present invention, preferred is a diester compound to be obtained from an aliphatic dicarboxylic acid having from 8 to 30 carbon atoms and a diol having from 2 to 10 carbon atoms. An aliphatic dicarboxylic acid having at least 8 carbon atoms and a diamine having at least 2 carbon atoms are expected to exhibit the whitening preventing effect. On the other hand, an aliphatic dicarboxylic acid having at most 30 carbon atoms and a diol having at most 10 carbon atoms realize good and uniform dispersion in the polyamide composition. The aliphatic dicarboxylic acid may have a side chain or a double bond, but preferred here is a linear saturated aliphatic dicarboxylic acid. One alone or two or more different types of such diester compounds may be used here either singly or as combined.

The aliphatic dicarboxylic acid includes stearic acid (C18), eicosanoic acid (C20), behenic acid (C22), montanic acid (C28), triacontanoic acid (C30), etc. The diol includes ethylene glycol, propanediol, butanediol, hexanediol, xylylene glycol, cyclohexanedimethanol, etc. Diester compounds to be obtained by combining these are preferred here.

Especially preferred is a diester compound to be obtained from an aliphatic dicarboxylic acid comprising mainly montanic acid and a diol comprising mainly ethylene glycol and/or 1,3-butanediol.

In the present invention, the amount to be added of the diamide compound and/or the diester compound may be from 0.005 to 0.5 parts by mass relative to 100 parts by mass of the polyamide compound, preferably from 0.05 to 0.5 parts by mass, more preferably from 0.12 to 0.5 parts by mass. When the compound is added in an amount of at least 0.005 parts by mass relative to 100 parts by mass of the polyamide compound and when the compound is combined with the crystallisation nucleating agent, then the synergistic effect for whitening prevention is expected. When the amount of the compound is at most 0.5 parts by mass relative to 100 parts by mass of the polyamide compound, then the haze value of the shapes to be obtained by forming the polyamide composition of the present invention can be kept low.

3-1-2. Crystallization Nucleating Agent

Preferably, a crystallization nucleating agent is added to the polyamide composition of the present invention from the viewpoint of improving the transparency of the composition. The agent is effective not only for improving the transparency but also for whitening prevention through crystallization after hot water treatment or after long-term aging; and by adding the crystallization nucleating agent to the polyamide compound, the crystal size can be reduced to at most ½ of the wavelength of visible light. When the diamide compound and/or the diester compound is used here along with the crystallization nucleating agent, their synergistic effect realizes much more excellent whitening prevention than the degree thereof expected from the whitening preventing effect of the individual ingredients.

Inorganic crystallization nucleating agents usable in the present invention are those generally used for thermoplastic resins, including glass fillers (glass fibers, milled glass fibers, glass flakes, glass beads, etc.), calcium silicate fillers (wollastonite, etc.), mica, talc (powdery talc, or granular talc with rosin as a binder, etc.), kaolin, potassium titanate whiskers, boron nitride, clay such as phyllosilicate, nanofillers, carbon fibers, etc. Two or more of these may be used here as combined. Preferably, the maximum diameter of the inorganic crystallization nucleating agent is from 0.01 to In particular, powdery talc having a particle size of at most 3.0 µm is preferred, powdery talc having a particle size of from 1.5 to 3.0 µm or so is more preferred, and powdery talc having a particle size of at most 2.0 µm is even more preferred. Granular talc prepared by adding rosin as a binder to the powdery talc is especially preferred since the dispersion state thereof in the polyamide composition is good. Organic crystallization nucleating agents preferred for use herein are micro-level to nano-level size bimolecular membrane capsules containing a crystallization nucleating agent, as well as bis(benzylidene)sorbitol-type or phosphorus-containing transparent crystallization nucleating agents, rosinamide-type gelling agents, etc. Especially preferred are bis(benzylidene)sorbitol-type crystallization nucleating agents.

The amount of the crystallization nucleating agent to be added is preferably from 0.005 to 2.0 parts by mass relative to 100 parts by mass of the polyamide compound, more preferably from 0.01 to 1.5 parts by mass. At least one such crystallization nucleating agent is added to the polyamide compound along with the diamide compound and/or the diester compound added thereto, thereby attaining the synergistic whitening preventing effect. Especially preferably, the inorganic crystallization nucleating agent such as talc or the like is added in an amount of from 0.05 to 1.5 parts by mass relative to 100 parts by mass of the polyamide compound, and the organic crystallization nucleating agent such as bis(benzylidene)sorbitol-type crystallization nucleating agent or the like is added in an amount of from 0.01 to 0.5 parts by mass relative to 100 parts by mass of the polyamide compound.

The bis(benzylidene)sorbitol-type crystallization nucleating agent is selected from bis(benzylidene)sorbitol and bis(alkylbenzylidene)sorbitol, and is a condensation product (diacetal compound) to be produced through acetalization of sorbitol and benzaldehyde or alkyl-substituted benzaldehyde; and this can be conveniently produced according to various methods known in the art. In this, the alkyl may be linear or cyclic, and may be saturated or unsaturated. An ordinary production method comprises reaction of 1 mol of D-sorbitol and about 2 mol of aldehyde in the presence of an acid catalyst. The reaction temperature may vary in a broad range depending on the properties (melting point, etc.) of the aldehyde to be used as the starting material for the reaction. The reaction medium may be an aqueous medium or a nonaqueous medium. One preferred method for preparing the diacetal for use in the present invention is described in U.S. Pat. No. 3,721,682. The disclosed contents are limited to benzylidene sorbitols; however, the bis(alkylbenzylidene)sorbitol for use in the present invention can be conveniently produced according to the method disclosed in the reference.

Specific examples of the bis(benzylidene)sorbitol-type crystallization nucleating agent (diacetal compounds) include bis(p-methylbenzylidene)sorbitol, bis(p-ethylbenzylidene)sorbitol, bis(n-propylbenzylidene)sorbitol, bis(p-isopropybenzylidene)sorbitol, bis(p-isobutylbenzylidene)sorbitol, bis(2,4-dimethylbenzylidene)sorbitol, bis(3,4-dimethylbenzylidene)sorbitol, bis(2,4,5-trimethylbenzylidene)sorbitol, bis(2,4,6-trimethylbenzylidene)sorbitol, bis(4-biphenylbenzylidene)sorbitol, etc.

Examples of the alkyl-substituted benzaldehyde suitable for preparing the bis(benzylidene)sorbitol-type crystallization nucleating agent include p-methylbenzaldehyde, n-propylbenzaldehyde, p-isopropylbenzaldehyde, 2,4-dimethylbenzaldehyde, 3,4-dimethylbenzaldehyde, 2,4,5-trimethylbenzaldehyde, 2,4,6-trimethylbenzaldehyde, 4-biphenylbenzaldehyde.

When the crystallization nucleating agent such as talc, mica, clay or the like is added to the polyamide compound, then the crystallization speed of the compound is accelerated by at least two times that of the polyamide compound to which the agent is not added. This would cause no problem in injection molding use that requires a large number of molding cycles; however, for deep-drawn cups to be formed from a stretched film or sheet, when the crystallization speed is too high, the film or sheet could not be stretched owing to crystallization, or may be broken or may have other problems of stretching unevenness, or that is, in these cases, the moldability greatly worsens. However, the bis(benzylidene)sorbitol-type crystallization nucleating agent does not accelerate the crystallization speed of the polyamide compound even when added to the compound, and therefore, the agent is preferably used for deep-drawn caps to be formed from stretched film or sheet.

Further, it has been found that the bis(benzylidene)sorbitol-type crystallization nucleating agent is effective, not only for whitening prevention but also for improving the oxygen barrier property of the polyamide compound when added to the compound. Use of the bis(benzylidene)sorbitol-type crystallization nucleating agent that realizes both effects of whitening prevention and oxygen barrier property improvement is especially preferred here.

The polyamide composition of the present invention, to which is added a phyllosilicate, can be used as a barrier layer, and the composition can enhance not only the oxygen barrier property of shapes but also the other barrier property to other gases such as carbon dioxide, etc.

The phyllosilicate is a 2-octahedral or 3-octahedral phyllosilicate having a charge density of from 0.25 to 0.6. The 2-octahedral phyllosilicate includes montmorillonite, beidellite, etc.; and the 3-octahedral phyllosilicate includes hectorite, saponite, etc. Of those, preferred is montmorillonite.

The phyllosilicate is preferably one in which the layer-to-layer distance is broadened by previously bringing the phyllosilicate into contact with an organic swelling agent such as a polymer compound, an organic compound or the like. As the organic swelling agent, preferred for use herein is a quaternary ammonium salt, and more preferred is a quaternary ammonium salt having at least one alkyl or alkenyl group with 12 or more carbon atoms.

Specific examples of the organic swelling agent include trimethylalkylammonium salts such as trimethyldodecylammonium salts, trimethyltetradecylammonium salts, trimethylhexadecylammonium salts, trimethyloctadecylammonium salts, trimethyleicosylammonium salts, etc.; trimethylalkenylammonium salts such as trimethyloctadecenylammonium salts, trimethyloctadecadienylammonium salts, etc.; triethylalkylammonium salts such as triethyldodecylammonium salts, triethyltetradecylammonium salts, triethylhexadecylammonium salts, trimethyloctadecylammonium salts, etc.; tributylalkylammonium salts such as tributyldodecylammonium salts, tributyltetradecylammonium salts, tributylhexadecylammonium salts, tributyloctadecylammonium salts, etc.; dimethyldialkylammonium salts such as dimethyldidodecylammonium salts, dimethylditetradecylammonium salts, dimethyldihexadecylammonium salts, dimethyldioctadecylammonium salts, dimethylditallowammonium salts, etc.; dimethyldialkenylammonium salts such as dimethyldioctadecenylammonium salts, dimethyldioctadecadienylammonium salts, etc.; diethyldialkylammonium salts such as diethyldidodecylammonium salts, diethylditetradecylammonium salts, diethyldihexadecylammonium salts, diethyldioctadecylammonium salts, etc.; dibutyldialkylammonium salts such as dibutyldidodecylammonium salts, dibutylditetradecylammonium salts, dibutyldihexadecylammonium salts, dibutyldioctadecylammonium salts, etc.; methylbenzyldialkylammonium salts such as methylbenzyldihexadecylammonium salts, etc.; dibenzyldialkylammonium salts such as dibenzyldihexadecylammonium salts, etc.; trialkylmethylammonium salts such as tridecylmethylammonium salts, tritetradecylmethylammonium salts, trioctadecylmethylammonium salts, etc.; trialkylmethylammonium salts such as tridodecylethylammonium salts, etc.; trialkylbutylammonium salts such as tridodecylbutylammonium salts, etc.; ω-amino acids such as 4-amino-n-butyric acid, 6-amino-n-caproic acid, 8-aminocaprylic acid, 10-aminodecanoic acid, 12-aminododecanoic acid, 14-aminotetradecanoic acid, 16-aminohexadecanoic acid, 18-aminooctadecanoic acid, etc. In addition, also usable here as an organic swelling agent are ammonium salts containing a hydroxyl group and/or an ether group, above all, quaternary ammonium salts containing at least one alkylene glycol residue are also usable here, such as methyldialkyl(PAG)ammonium salts, ethyldiallcyl(PAG)ammonium salts, butyldialkyl(PAG)ammonium salts, dimethylbis(PAG)ammonium salts, diethylbis(PAG)ammonium salts, dibutylbis(PAG)ammonium salts, methylalkylbis(PAG)ammonium salts, ethylalkylbis(PAG)ammonium salts, butylalkylbis(PAG)ammonium salts, methyltri(PAG)ammonium salts, ethyltri(PAG)ammonium salts, butyltri(PAG)ammonium salts, tetra(PAG)ammonium salts (in which alkyl means an alkyl group having at least 12 carbon atoms such as dodecyl, tetradecyl, hexadecyl, octadecyl, eicosyl, etc.; and PAG means a polyalkylenes glycol residue, preferably a polyethylene glycol residue or a polypropylene glycol residue having at most 20 carbon atoms). Above all, preferred are trimethyldodecylammonium salts, trimethyltetradecylammonium salts, trimethylhexadecylammonium salts, trimethyloctadecylammonium salts, dimethyldidodecylammonium salts, dimethylditetradecylammonium salts, dimethyldihexadecylammonium salts, dimethyldioctadecylammonium salts, dimethylditallowammonium salts. One alone or two or more different types of these organic swelling agents may be used here either singly or as combined.

In the present invention, preferably, the phyllosilicate salt treated with an organic swelling agent is added in an amount of from 0.5 to 8 parts by mass relative to 100 parts by mass of the polyamide compound, more preferably from 1 to 6 parts by mass, even more preferably from 2 to 5 parts by mass. When the amount of the phyllosilicate salt added is less than 0.5 parts by mass, then it is unfavorable since the effect thereof to improve the gas barrier property of the polyamide composition is poor. On the other hand, when more than 8 parts by mass, it is also unfavorable since the gas barrier layer would get cloudy therefore detracting from the transparency of containers.

In the polyamide composition, preferably, the phyllosilicate salt is uniformly dispersed, not locally aggregated therein. Uniform dispersion as referred to herein means that the phyllosilicate salt particles are tabularly separated from each other, and at least 50% thereof are spaced from each other via an interlayer distance of at least 5 nm. The interlayer distance as referred to herein means the distance between centroids of the tabular particles. A larger interlayer distance means a better dispersion condition; and the dispersion having a larger interlayer distance could provide a better appearance such as better transparency of shapes, and could enhance more the gas barrier property for oxygen, carbon dioxide and others of shapes.

3-1-3. Gelation Preventing/Fish Eyes Reducing Agent

In the polyamide composition of the present invention, preferably, at least one carboxylate salt selected from sodium acetate, potassium acetate, magnesium acetate, calcium stearate, magnesium stearate, sodium stearate and their derivatives is added to the polyamide compound. The derivatives include metal 12-hydroxystearates such as calcium 12-hydroxystearate, magnesium 12-hydroxystearate, sodium 12-hydroxystearate, etc. Adding the carboxylate salt prevents gelation of the polyamide compound during working and forming the polyamide composition and reduces fish eyes in the resulting shapes, therefore enhancing the formability of the composition.

The amount of the carboxylate salt to be added is preferably from 400 to 10000 ppm as the concentration thereof in the polyamide composition, more preferably from 800 to 5000 ppm, even more preferably from 1000 to 3000 ppm. When the amount is at least 400 ppm, then the polyamide compound can be prevented from being thermally deteriorated and can be prevented from gelling. On the other hand, when at most 10000 ppm, then the polyamide composition does not fail to be shaped and does not discolor or whiten. When a carboxylate salt of a basic substance exists in a molten polyamide compound, then the thermal degradation of the polyamide compound could be retarded and the formation of a gel that is considered to be a final degraded product could be prevented. The above-mentioned carboxylate salts are excellent in handleability, and among these, metal stearates are inexpensive and have an additional effect as a lubricant, and are therefore preferred for use herein as capable of more stabilizing the operation of working and forming the polyamide composition. The morphology of the carboxylate salt is not specifically defined. Preferably, the salt is powdery and has a small particle size as it is easy to uniformly disperse the salt in the polyamide composition in dry mixing. Concretely, the particle size is preferably at most 0.2 mm.

3-1-4. Antioxidant

Preferably, an antioxidant is added to the polyamide composition of the present invention from the viewpoint of controlling the oxygen absorption performance of the composition and inhibiting the physical properties of the composition from worsening. Examples of the antioxidant include a copper-based antioxidant, a hindered phenol-type antioxidant, a hindered amine-type antioxidant, a phosphorus-containing antioxidant, a thio-type antioxidant, etc. Above all, preferred are a hindered phenol-type antioxidant and a phosphorus-containing antioxidant.

Specific examples of the hindered phenol-type antioxidant include triethylene glycol bis[3-(3-t-butyl-5-methyl-4-hydroxyphenyl)propionate, 4,4'-butylidene-bis(3-methyl-6-t-butylphenol), 1,6-hexanediol bis[3-(3,5-di-t-butyl-4-hydroxyphenyl)propionate, 2,4-bis-(n-octylthio-6-(4-hydroxy-3,5-di-t-butylanilino)1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl) propionate], octadecyl 3-(3,5-di-t-butyl-4-hydroxyphenyl) propionate, 2,2-thiobis(4-methyl-6-1-butylphenol), N,N'-hexamethylenebis(3,5-di-t-butyl-4-hydroxyhydroxycinnamide), 3,5-di-t-butyl-4-hydroxybenzylphosphonate diethyl ester, 1,3,5-trimethyl-2,4,6-tris (3,5-di-t-butyl-4-hydroxybenzyl)benzene, ethyl calcium bis(3,5-di-t-butyl-4-hydroxybenzyl) sulfonate, tris-(3,5-di-t-butyl-4-hydroxybenzyl) isocyanurate, 2,6-di-t-butyl-p-cresol, butylated hydroxyanisole, 2,6-di-t-butyl-4-ethylphenol, stearyl-β-(3,5-di-t-butyl-4-hydroxyphenyl)propionate, 2,2'-methylenebis-(4-methyl-6-t-butylphenol), 2,2'-methylenebis (4-ethyl-6-t-butylphenol), 4,4'-thiobis-(3-methyl-6-t-butylphenol), octylated diphenylamine, 2,4-bis[(octylthio) methyl]-O-cresol, isooctyl 3-(3,5-di-t-butyl-4-hydroxyphenyl)propionate, 4,4'-butylidenebis(3-methyl-6-t-butylphenol), 3,9-bis[1,1-dimethyl-2-[β-(3-t-butyl-4-hydroxy-5-methylphenyl)propionyloxy]ethyl]2,4,8,10tetroxaspiro[5,5]undecane, 1,1,3-tris(2-methyl-4-hydroxy-5-t-butylphenyl)butane, 1,3,5-trimethyl-2,4,6-tris (3,5-di-t-butyl-4-hydroxybenzyl)benzene, bis[3,3'-bis(4'-hydroxy-3'-t-butylphenyl)butyric acid]glycol ester, 1,3,5-tris (3',5 di-t-butyl-4'-hydroxybenzyl)sec-triazine-2,4,6-(1H,3H, 5H)trione, d-α-tocopherol, etc. These may be used here either alone or as combined. Specific examples of commercial products of hindered phenol compounds include BASF's Irganox 1010 and Irganox 1098 (both trade names).

Specific examples of the phosphorus-containing antioxidant include organic phosphorus compounds such as triphenyl phosphite, trioctadecyl phosphite, tridecyl phosphite, trinonylphenyl phosphite, diphenylisodecyl phosphite, bis(2,6-di-tert-butyl-4-methylphenyl)pentaerythritol diphosphite, bis(2,4-di-tert-butylphenyl)pentaerythritol diphosphite, tris (2,4-di-tert-butylphenyl) phosphite, distearylpentaerythritol diphosphite, tetra(tridecyl-4,4'-isopropylidenediphenyl) diphosphite, 2,2-methylenebis(4,6-di-tert-butylphenyl)octyl phosphite, etc. These may be used here either alone or as combined.

The content of the antioxidant in the polyamide compound is not limited, falling within a range not detracting from the properties of the composition. However, from the viewpoint of controlling the oxygen absorption performance of the composition and inhibiting the physical properties of the composition from worsening, the content is preferably from 0.001 to 3 parts by mass relative to 100 parts by mass of the polyamide compound of the present invention, more preferably from 0.01 to 1 part by mass.

3-1-5. Impact Resistance Improver

An impact resistance improver may be added to the amide composition containing the polyamide compound of the present invention for improving the impact resistance of the composition and the pinhole resistance and the flexibility of the films of the composition. The impact resistance improver to be added includes polyolefin, polyamide elastomer, hydrogenated styrene-butadiene copolymer resin, ionomer, ethylene-ethyl acrylate copolymer resin, maleic anhydride-modified ethylene-ethyl acrylate copolymer resin, ethylene-methacrylic acid copolymer resin, nylon 6, 66, 12, nylon 12, nylon 12 elastomer, ethylene-propylene copolymer elastomer, polyester elastomer, etc. The amount of the impact resistance improver to be added is preferably from 1 to 10% by mass, more preferably from 1 to 5% by mass, even more preferably from 2 to 3% by mass. When the added amount is too large, then the transparency and the gas barrier property of the composition may lower. When the added amount is too small, then the pinhole resistance and the flexibility of the films of the composition could not be enhanced so much.

3-2. Resin

The polyamide compound of the present invention may be mixed with various resins in accordance with the intended use and performance to give a polyamide composition. Not specifically defined, the resin to be mixed with the polyamide compound of the present invention is preferably at least one selected from the group consisting of polyolefins, polyesters, polyamides, polyvinyl alcohols and vegetable-derived resins.

Of those, preferred is blending with a resin having a high oxygen barrier performance such as polyester, polyamide and polyvinyl alcohol, for effectively exhibiting the oxygen absorbing effect.

Any conventional known method is employable for mixing the polyamide compound with resin, but preferred is melt-mixing. In case where the polyamide compound of the present invention is melt-mixed with a resin and formed into desired pellets or shapes, they may be melt-blended with an extruder or the like. The extruder may be a single-screw or double-screw extruder, but from the viewpoint of the mixing performance thereof, preferred is a double-screw extruder. As the screw for melting, usable here are any known screws, for example, those for nylon or polyolefin, as well as those for mild compression or rapid compression, and single-flight or double-flight screws, to which, however, the present invention is not limited.

3-2-1. Polyolefin

Specific examples of the polyolefin include olefin homopolymers such as polyethylene, polypropylene, polybutene-1, poly-4-methylpentene-1, etc.; copolymers of ethylene and α-olefin, such as ethylene-propylene random copolymer, ethylene-propylene block copolymer, ethylene-propylene-poly-butene-1 copolymer, ethylene-cyclic olefin copolymer, etc.; other ethylene copolymers such as ethylene-α,β-unsaturated carboxylic acid copolymer, ethylene-α,β-unsaturated carboxylate copolymer, ion-crosslinked, ethylene-α,β-unsaturated carboxylic acid copolymer, ethylene-vinyl acetate copolymer, partially or wholly-saponified, ethylene-vinyl acetate copolymer, etc.; graft-modified polyolefins produced by graft-modifying these polyolefins with acid anhydride such as maleic anhydride, etc.

3-2-2. Polyester

The polyester includes those formed of one or more selected from polycarboxylic acids including dicarboxylic acids and their ester-forming derivatives, and one or more selected from polyalcohols including glycol; those comprising a hydroxycarboxylic acid and its ester-forming derivative; and those comprising a cyclic ester.

The dicarboxylic acid includes saturated aliphatic dicarboxylic acids such as typically oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, dimer acid, and their ester-forming derivatives; unsaturated aliphatic dicarboxylic acids such as typically fumaric acid, maleic acid, itaconic acid, and their ester-forming derivatives; aromatic dicarboxylic acids such as orthophthalic acid, isophthalic acid, terephthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid, pamoic acid, anthracenedicarboxylic acid, and their ester-forming derivatives; metal sulfonate group-containing aromatic dicarboxylic acids such as typically 5-sodium-sulfoisophthalic acid, 2-sodium-sulfoterephthalic acid, 5-lithium-sulfoisophthalic acid, 2-lithium-sulfoterephthalic acid, 5-potassium-sulfoisophthalic acid, 2-potassium-sulfoterephthalic acid, and their lower alkyl ester derivatives, etc.

Of the above-mentioned dicarboxylic acids, especially preferred is use of terephthalic acid, isophthalic acid or naphthalenedicarboxylic acid, from the viewpoint of the physical properties of the polyester to be obtained, and if desired, any other dicarboxylic acid may be copolymerized with the polyester.

Other polycarboxylic acids than these dicarboxylic acids include ethanetricarboxylic acid, propanetricarboxylic acid, butanetetracarboxylic acid, pyromellitic acid, trimellitic acid, trimesic acid, 3,4,3',4'-biphenyltetracarboxylic acid, and their ester-forming derivatives, etc.

The glycol includes aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-docecanediol, polyethylene glycol, polytrimethylene glycol, polytetramethylene glycol, etc.; aromatic glycols such as hydroquinone, 4,4'-dihydrobisphenol, 1,4-bis(β-hydroxyethoxy)benzene, 1,4-bis(β-hydroxyethoxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol, glycols prepared by adding ethylene oxide to these glycols, etc.

Of the above-mentioned glycols, especially preferred is use of ethylene glycol, 1,3-propylene glycol, 1,4-butylene glycol, or 1,4-cyclohexanedimethanol as the main ingredient. Other polyalcohols than these glycols include trimethylolmethane, trimethylolethane, trimethylolpropane, pentaerythritol, glycerol, hexanetriol, etc. The hydroxycarboxylic acid includes lactic acid, citric acid, malic acid, tartaric acid, hydroxyacetic acid, 3-hydroxyacetic acid, p-hydroxybenzoic acid, p-(2-hydroxyethoxy)benzoic acid, 4-hydroxycyclohexanecarboxylic acid, and their ester-forming derivatives.

The cyclic ester includes ε-caprolactone, β-propiolactone, β-methyl-β-propiolactone, δ-valerolactone, glycolide, lactide, etc.

The ester-forming derivatives of polycarboxylic acids and hydroxycarboxylic acids include alkyl esters, acid chlorides, acid anhydrides and the like thereof.

The polyester for use in the present invention is preferably a polyester in which the main acid component is a terephthalic acid or its ester-forming derivative or a naphthalenedicarboxylic acid or its ester-forming derivative and the main glycol component is an alkylene glycol.

The polyester in which the main acid component is a terephthalic acid or its ester-forming derivative is preferably a polyester in which a terephthalic acid or its ester-forming derivative accounts for at least 70 mol % in total of the entire acid component therein, more preferably at least 80 mol %, even more preferably at least 90 mol %. Similarly, the polyester in which the main acid component is a naphthalenedicarboxylic acid or its ester-forming derivative is preferably a polyester in which a naphthalenedicarboxylic acid or its ester-forming derivative accounts for at least 70 mol % in total of the entire acid component therein, more preferably at least 80 mol %, even more preferably at least 90 mol %.

The naphthalenedicarboxylic acid or its ester-forming derivative usable in the present invention is preferably 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, as exemplified hereinabove for the above-mentioned dicarboxylic acids, or the ester-forming derivative thereof.

The polyester in which the main glycol component is an alkylene glycol is preferably a polyester in which an allylene glycol accounts for at least 70 mol % in total of the entire glycol component, more preferably at least 80 mol %, even more preferably at least 90 mol %. The alkylene glycol as referred to herein may contain a substituent or an alicyclic structure in the molecular chain thereof.

The other copolymerization component than the above-mentioned terephthalic acid/ethylene glycol is preferably at least one selected from the group consisting of isophthalic acid, 2,6-naphthalenedicarboxylic acid, diethylene glycol, neopentyl glycol, 1,4-cyclohexanedimethanol, 1,2-propanediol, 1,3-propanediol and 2-methyl-1,3-propanediol, from the viewpoint of satisfying both transparency and formability, and is more preferably at least one selected from the group consisting of isophthalic acid, diethylene glycol, neopentyl glycol, 1,4-cyclohexanedimethanol.

One preferred example of the polyester for use in the present invention is a polyester in which the main recurring unit is formed of ethylene terephthalate, and more preferred is a linear polyester containing an ethylene terephthalate unit in an amount of at least 70 mol %, even more preferred is a linear polyester containing an ethylene terephthalate unit in an amount of at least 80 mol %, and still more preferred is a linear polyester containing an ethylene terephthalate unit in an amount of at least 90 mol %.

Another preferred examples of the polyester for use in the present invention is a polyester in which the main recurring unit is formed of ethylene 2,6-naphthalate, and more preferred is a linear polyester containing an ethylene 2,6-naphthalate unit in an amount of at least 70 mol %, even more preferred is a linear polyester containing an ethylene 2,6-naphthalate unit in an amount of at least 80 mol %, and still more preferred is a linear polyester containing an ethylene 2,6-naphthalate unit in an amount of at least 90 mol %.

Still another preferred examples of the polyester for use in the present invention is a linear polyester containing propylene terephthalate unit in an amount of at least 70 mol %, a linear polyester containing a propylene naphthalate unit in an amount of at least 70 mol %, a linear polyester containing a 1,4-cyclohexanedimethylene terephthalate unit in an amount of at least 70 mol %, a linear polyester containing a butylene naphthalate unit in an amount of at least 70 mol %, or a linear polyester containing a butylene terephthalate unit in an amount of at least 70 mol %.

As the composition of the entire polyester, preferred is a combination of terephthalic acid/isophthalic acid//ethylene glycol, a combination of terephthalic acid//ethylene glycol/1,4-cyclohexanedimethanol, or a combination of terephthalic acid//ethylene glycol/neopentylglycol, from the viewpoint of satisfying both transparency and formability. Needless-to-say, naturally, the polyester may contain a small amount (at most 5 mol %) of diethylene glycol to be formed through dimerization of ethylene glycol during esterification (interesterification) and polycondensation.

Still another preferred example of the polyester for use in the present invention is a polyglycolic acid to be obtained through polycondensation of glycolic acid or methyl glycolate or through ring-opening polycondensation of a glycolide. The polyglycolic acid may be copolymerized with any other component such as lactide, etc.

3-2-3. Polyamide

The polyamide for use in the present invention (the "polyamide" as referred to here indicates the polyamide resin to be mixed with the "polyamide compound" of the present invention, but does not indicate the "polyamide compound" itself of the present invention) includes a polyamide comprising, as the main constituent unit therein, a unit derived from a lactam or an aminocarboxylic acid, an aliphatic polyamide comprising, as the main constituent unit therein, a unit derived from an aliphatic diamine and an aliphatic dicarboxylic acid, a partially aromatic polyamide comprising, as the main constituent unit therein, a unit derived from an aliphatic diamine and an aromatic dicarboxylic acid, a partially aromatic polyamide comprising, as the main constituent unit therein, a unit derived from an aromatic diamine and an aliphatic dicarboxylic acid, etc., and if desired, the polyamide may be copolymerized with any other monomer unit than the main constituent unit therein.

The lactam or the aminocarboxylic acid for use herein includes lactams such as ε-caprolactam, laurolactam, etc.; aminocarboxylic acids such as aminocaproic acid, aminoundecanoic acid, etc.; aromatic amino carboxylic acids such as para-aminomethylbenzoic acid, etc.

The aliphatic diamine for use herein includes aliphatic diamines having from 2 to 12 carbon atoms, and their functional derivatives. This may also be an alicyclic diamine. The aliphatic diamine may be a linear chain-like aliphatic diamine or a branched chain-like aliphatic diamine. Specific examples of the linear chain-like aliphatic diamine include aliphatic diamines such as ethylene diamine, 1-methylethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, etc. Specific examples of the alicyclic diamine include cyclohexanediamine, 1,3-bis(aminomethyl)cyclohexane, 1,4-bis(aminomethyl)cyclohexane, etc.

The aliphatic dicarboxylic acid is preferably a linear aliphatic dicarboxylic acid or an alicyclic dicarboxylic acid, more preferably a linear aliphatic dicarboxylic acid having an alkylene group with from 4 to 12 carbon atoms. Examples of the linear aliphatic dicarboxylic acid of the type include adipic acid, sebacic acid, malonic acid, succinic acid, glutaric acid, pimelic acid, suberic acid, azelaic acid, undecanoic acid, undecanedioic acid, dodecanedioic acid, dimer acid and their functional derivatives. The alicyclic dicarboxylic acid includes alicyclic dicarboxylic acids such as 1,4-cyclohexanedicarboxylic acid, hexahydroterephthalic acid, hexahydroisophthalic acid, etc.

The aromatic diamine includes metaxylylenediamine, para-xylylenediamine, para-bis(2-aminoethyl)benzene, etc.

The aromatic dicarboxylic acid includes terephthalic acid, isophthalic acid, phthalic acid, 2,6-naphthalenedicarboxylic acid, diphenyl-4,4'-dicarboxylic acid, diphenoxyethanedicarboxylic acid and their functional derivatives, etc.

Concrete polyamides include polyamide 4, polyamide 6, polyamide 10, polyamide 11, polyamide 12, polyamide 4,6, polyamide 6,6, polyamide 6,10, polyamide 6T, polyamide 9T, polyamide 6IT, polymetaxylyleneadipamide (polyamide MXD6), isophthalic acid-copolymerized polymetaxylylenadipamide (polyamide MXD6I), polymetaxylylenesebacamide (polyamide MXD10), polymetaxylylenedodecanamide (polyamide MXD12), poly-1,3-bisaminocyclohexaneadipamide (polyamide BAC6), polyparaxylylenesebacamide (polyamide PXD10), etc. More preferred polyamides are polyamide 6, polyamide MXD6, polyamide MXD6I.

As the copolymerization component of the polyamide, usable is a polyether having at least one terminal amino group or at least one terminal carboxyl group and having a number-average molecular weight of from 2000 to 20000, or an organic carboxylic acid salt of the polyether having at least one terminal amino group, or an amine salt of the polyether having at least one carboxyl group. Concrete examples of the component include bis(aminopropyl)poly(ethylene oxide) (polyethylene glycol having a number-average molecular weight of from 2000 to 20000).

The partially aromatic polyamide may contain a constituent unit derived from a tribasic or more polycarboxylic acid such as trimellitic acid, pyromellitic acid or the like, within a range within which its structure is substantially linear.

The polyamide may be produced basically according to a conventional known, melt polycondensation method in the presence of water or melt polycondensation method in the absence of water, or according to a solid-phase polymerization method of further processing the polyamide obtained according to the previous melt polycondensation method. The melt polycondensation reaction may be attained in one stage or may be attained in multiple stages. The apparatus for the method may be a batch reaction apparatus, or may be a continuous reaction apparatus. The melt polycondensation step and the solid-phase polymerization step may be attained continuously, or may be attained intermittently as separated.

3-2-4. Polyvinyl Alcohol

Specific examples of the polyvinyl alcohol include polyvinyl alcohol, ethylene-vinyl alcohol copolymer and their partially or wholly saponified products, etc. Further, their modified product may also be usable here.

3-2-5. Vegetable-Derived Resin

Not specifically defined, concrete examples of the vegetable-derived resin include various aliphatic polyester-type biodegradable resins starting from any others than petroleum, though partly overlapping with the above-mentioned resins. The aliphatic polyester-type biodegradable resins include, for example, poly($\alpha$-hydroxy acids) such as polyglycolic acid (PGA), polylactic acid (PLA), etc.; polyalkylenes alkanoates such as polybutylene succinate (PBS), polyethylene succinate (PES), etc.

4. Use of Polyamide Compound and Polyamide Composition

The polyamide compound and the polyamide composition of the present invention are usable for various applications that require oxygen barrier property and oxygen absorption performance. For example, the polyamide compound of the present invention can be filled in small pouches by itself therein and can be used as an oxygen absorbent.

Typical application examples of the polyamide compound and the polyamide composition of the present invention include shapes of packaging materials, packaging containers, etc., to which, however, the present invention is not limited. The polyamide compound or the polyamide composition of the present invention may be worked to give a shape that comprising it as at least a part of the shape for use in the present invention. For example, the polyamide compound or the polyamide composition of the present invention may be used as at least a part of a filmy or sheet-like packaging material. In addition, it may be used as at least a part of packaging containers such as bottles, trays, cups, tubes, as well as various types of pouches such as flat pouches, standing pouches, etc. The structure of the shape of the packaging material or the packaging container may be a single-layer structure comprising a layer of the polyamide compound or the polyamide composition of the present invention, or may be a multilayer structure comprising a combination of that layer and a layer of any other thermoplastic resin. Not specifically defined, the thickness of the layer of the polyamide compound or the polyamide composition of the present invention is preferably at least 1 μm.

The method for producing the shapes of packaging materials and packaging containers is not specifically defined, for which any method is employable. For example, for forming a filmy or sheet-like packaging material, or a tubular packaging material, the polyamide compound or the polyamide composition of the present invention that has been melted through a T-die, a circular die or the like may be extruded out through the accompanying extruder. The filmy shape obtained according to the above-mentioned method may be stretched to give a stretched film. The bottle-shaped packaging containers may be produced by injecting a molten polyamide compound or polyamide composition into a mold from an injection-molding machine to prepare a preform, followed by blow-stretching it by heating up to the stretching temperature thereof.

Containers such as trays, cups and the like can be produced according to a method of injecting a molten polyamide compound or polyamide composition into a mold from an injection-molding machine followed by molding it therein, or according to a method of forming a sheet-like packaging material into shapes in a mode of vacuum forming, pressure forming or the like. The packaging materials and the packaging containers can be produced according to various methods, not limited to the above-mentioned production methods.

The packaging materials and the packaging containers obtained by the use of the polyamide compound and the polyamide composition of the present invention are suitable for housing and storing various goods. For example, they can be used for housing and storing various goods such as drinks, seasonings, cereals, liquid and solid processed foods that are needed to be filled in a germ-free condition or to be thermally sterilized, chemicals, liquid livingware, drugs, semiconductor integrated circuits, electronic devices, etc.

EXAMPLES

The present invention is described in more detail with reference to the following Examples; however, the present invention is not limited to these Examples.

In the following Examples, poly(cyclo hexane-1,3-dimethylene)adipamide is referred to as "N-1,3BAC6" (where "6" indicates the carbon number of the aliphatic dicarboxylic acid-derived unit).

The polyamide compounds obtained in Examples and Comparative Examples were analyzed for the constituent composition, the relative viscosity, the number-average molecular weight, the glass transition temperature and the melting point thereof; according to the methods mentioned below. In addition, they were tested for the oxygen absorption, the oxygen transmission coefficient and the haze thereof according to the methods mentioned below. The organoleptic test and the tensile test for them are as mentioned below.

(1) Constituent Composition

Using an $^1$H-NMR apparatus (400 MHz; JEOL's trade name, JNM-AL400; test mode, NON ($^1$H)), the copolymer was quantitatively analyzed for the constituent composition thereof. Concretely, using formic acid-d as a solvent, a solution of 5% by mass of the polyamide compound was prepared and analyzed through $^1$H-NMR.

(2) Relative Viscosity 0.2 g of sample pellets were accurately weighed, and dissolved with stirring in 100 ml of 96% sulfuric acid at 20 to 30° C. After completely dissolved, 5 ml of the solution was rapidly taken in a Canon Fenske-type viscometer. This was left in a thermostat bath at 25° C. for 10 minutes, and then the dropping time (t) thereof was measured. The dropping time ($t_0$) of 96% sulfuric acid was also measured in the same manner, and the relative viscosity of the sample was calculated according to the following ratio.

Relative Viscosity=$t/t_0$ (3) Number-Average Molecular Weight (Mn)

First, the polyamide compound was weighed accurately, dissolved in a solution of phenol/ethanol=4/1 by volume with stirring at 20 to 30° C. After this was completely dissolved, the inner wall of the chamber was washed with 5 ml of methanol with stirring, and this was titered for neutralization with an aqueous solution of 0.01 mol/L hydrochloric acid thereby determining the terminal amino group concentration [$NH_2$] of the compound.

On the other hand, the polyamide compound was weighed accurately, dissolved with stirring in benzyl alcohol in a nitrogen current atmosphere at 160 to 180° C. After completely dissolved, this was cooled to 80° C. or lower in a nitrogen current atmosphere, and the inner wall of the chamber was washed with 10 ml of methanol with stirring, and this was titered for neutralization with an aqueous solution of 0.01 mol/L sodium hydroxide thereby determining the terminal carboxyl group concentration [COOH] of the compound.

From the terminal amino group concentration [$NH_2$] and the terminal carboxyl group concentration [COOH] thus determined, the number-average molecular weight of the compound was calculated according to the following formula:

Number-Average Molecular Weight=$2/([NH_2]+[COOH])$

[$NH_2$]: terminal amino group concentration (equivalent/g)
[COOH] terminal carboxyl group concentration (equivalent/g)

(4) Glass Transition Temperature and Melting Point

Using a differential scanning calorimeter (Shimadzu's trade name, DSC-60), the sample was analyzed through DSC (differential scanning calorimetry) in a nitrogen current atmosphere at a heating rate of 10° C./min, thereby determining the glass transition temperature (Tg) and the melting point (Tm) thereof (5) Oxygen Absorption A film sample having a thickness of about 100 μm was cut into a size of 400 $cm^2$, and put into a three-side sealed bag of an aluminium foil laminate film having a size of 25 cm×18 cm, along with cotton infiltrated with 10 ml of water therein, and sealed up so that the in-bag air amount could be 400 ml. The humidity inside the bag was made to be 100% RH (relative humidity). After thus stored at 40° C. for 28 days, the oxygen concentration inside the bag was measured with an oxygen concentration gauge (Toray Engineering's trade name, LC-700F). From the oxygen concentration, the oxygen absorption (cc/g) of the sample was calculated. The sample having a higher value of oxygen absorption is more excellent in oxygen absorption performance and is better.

In Examples 103, and 401 to 403, and Comparative Examples 401 to 403, 2 g of a powdery sample prepared by finely grinding the pellets of the polyamide compound with a grinder was wrapped with a medical paper and used in place of the film sample, and the oxygen absorption thereof was calculated in the same manner as previously described.

(6) Oxygen Transmission Coefficient

Using an oxygen permeability measuring apparatus (Mocon's Model OX-TRAN 2/21SH) according to ASTM D3985, the oxygen permeability of a 100-μm film was determined at 23° C. and 60% RH, and this was converted into the oxygen transmission coefficient (cc·mm/($m^2$·day·atm)) of the analyzed sample. The sample having a lower value transmits a smaller amount of oxygen and is better.

(7) Organoleptic Test Evaluation

A test piece prepared by cutting a film sample to have a size of 400 $cm^2$, or 2 g of a powdery sample prepared by grinding the pellets of the polyamide compound with a grinder followed by wrapping the powder in a medical paper was put into a three-side sealed bag of an aluminium foil laminate film (in this, the sealant for the innermost layer was an odorless grade one) having a size of 25 cm×18 cm, along with cotton infiltrated with 10 ml of water therein, and sealed up so that the in-bag air amount could be 400 ml. The humidity inside the bag was made to be 100% RH. After thus stored at 40° C. for 28 days, the air inside the bag was taken out with a syringe, and tested by 10 panelists for the odor thereof to evaluate the sample. As a comparative blank, a bag with neither a film sample nor a powdery sample therein was prepared. The organoleptic evaluation test was carried out according to the criteria mentioned below, and the points marked by 10 panelists were averaged to give the mean value of the sample. The sample given a smaller value is more odorless and is better.

(Evaluation Criteria)

0: No odor (blank).

1: Slight difference from the blank was felt.

2: Difference from the blank was felt.

3: Considerable difference from the blank was felt.

(8) Tensile Test

A film sample having a thickness of about 100 μm was stored in a thermostat bath at 40° C. and 100% RH for 28 days so that the sample was made to absorb oxygen, and then the sample was conditioned at 23° C. and 50% RH for 1 week. The film sample was cut into a piece having a width of 10 mm and a length of 100 mm, and tested with a tensile tester (Toyo Seiki's Strograph V1-C) at a pulling rate of 50 mm/min, whereupon the load at the break of the film was measured. According to the following formula, the tensile strength at break of the sample was calculated.

Tensile Strength at Break (MPa)=load at break (N)/cross-sectional area of sample film ($mm^2$)

The tensile strength at break determined in this test was taken as the index of the mechanical property retentiveness of the sample. For comparison, the original film sample before storage (before oxygen absorption) was conditioned at 23° C. and 50% RH for 1 week, and tested for the tensile strength thereof in the same manner as above. A higher value after oxygen absorption means that the resin deteriorated less after oxygen absorption, and the sample having a higher value is better.

(9) Haze

According to HS-K-7105, a sample film having a thickness of about 100 μm was analyzed with a haze meter (Nippon Denshoku's Model COH-300A), and the value was taken as the haze of the sample per 100 μm in thickness. The sample having a lower value is less discolored and is better.

Example 101

(Melt Polymerization for Polyamide Compound According to Normal-Pressure Instillation Method)

13000 g (89.0 mol) of accurately-weighed adipic acid (by Asahi Kasei Chemicals), 880.56 g (9.88 mol) of DL-alanine (by Musashimo Chemical Laboratory), 11.9 g (0.11 mol) of sodium hypophosphite and 6.16 g (0.075 mol) of sodium acetate were put into a reactor having an internal volume of 50 liters and equipped with a stirrer, a partial condenser, a complete condenser, a thermometer, a dropping funnel, a nitrogen-introducing duct and a strand die, fully purged with nitrogen, and then heated up to 170° C. while the system was stirred with a small amount of nitrogen current applied thereto. 12433 g (88.7 mol) of 1,3-bis(aminomethyl)cyclohexane having a cis-form/trans-form ratio of 74/26 (mol %) (by Mitsubishi Gas Chemical) was dropwise added thereto with stirring, and while the formed condensation water was removed out of the system, the system was continuously heated. After the addition of 1,3-bis(aminomethyl)cyclohexane, the internal temperature was kept at 260° C. and the reaction was continued for 40 minutes. Subsequently, the system was pressurized with nitrogen, and the polymer was taken out through the strand die, and pelletized. About 23 kg of a polyamide compound was thus obtained.

(Solid-Phase Polymerization of Polyamide Compound)

Next, the polyamide compound was fed into a jacketed tumble drier equipped with a nitrogen-introducing duct, a vacuum line, a vacuum pump and a thermocouple for internal temperature measurement, and while rotated at a constant speed, the inside of the tumble drier was fully purged with a nitrogen gas having a purity of at least 99% by volume, and then the tumble drier was heated in the nitrogen gas current atmosphere to thereby elevate the temperature of the pellets up to 150° C. taking about 150 minutes. At the time when the temperature of the pellets reached 150° C., the internal pressure was reduced to 1 Torr or less. This was further heated so that the temperature of the pellets could reach 190° C. taking about 70 minutes, and then this was kept at 190° C. for 30 minutes. Next, a nitrogen gas having a purity of at least 99% by volume was introduced into the system, and while the tumble drier was kept rotated, this was cooled to give DL-alanine-copolymerized N-1,3-BAC6 (polyamide compound 101).

Figure 2:
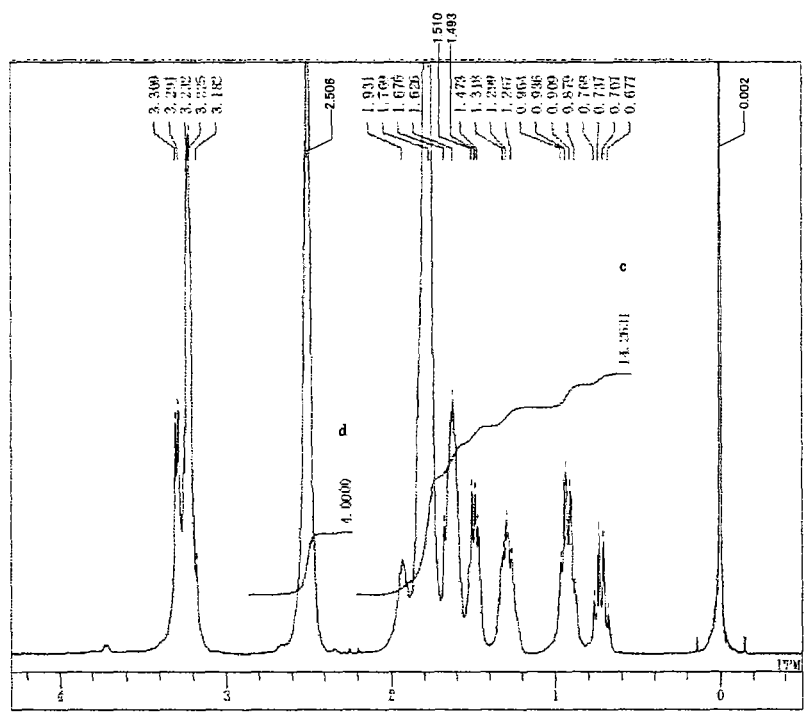
[FIG. 2] This is a $^1$H-NMR chart of the polyamide compound 101 produced in Example 101.

FIG. 1 shows a $^1$H-NMR chart of N-1,3-BAC6; and FIG. 2 shows that of the polyamide compound 101.

FIG. 1 shows a numerical value 13.9802 that is an integrated value of all the absorption peaks derived from hydrogens of 1,3-BAC in a range of from 0.70 to 1.95 ppm (this numerical value is represented by a). The cyclohexane ring in the recurring unit of 1,3-BAC contains 10 hydrogens. At around 2.5 ppm, there is shown a numerical value 4.0000 that is an integrated value of the absorption peaks derived from the methylene group-derived hydrogens adjacent to the carbonyl group of adipic acid (this value is represented by b). On the other hand, FIG. 2 shows a numerical value 14.2631 as an integrated value of all the absorption peaks derived from the methyl group of DL-alanine and the absorption peaks derived from the hydrogens of 1,3-BAC in a range of from 0.65 to 1.95 ppm (the numerical value obtained from the individual test samples differing from each other in the amino acid composition thereof, including other Examples, is represented by c). In this case, the integral intensity as calculated by subtracting a from c (c−a) is derived from the methyl group in DL-alanine of the polyamide compound. At around 2.5 ppm, there is shown a numerical value 4.0000 that is an integrated value of the absorption peaks derived from the methylene group-derived hydrogens adjacent to the carbonyl group of adipic acid (this value is represented by d). Since b and d are the same numerical value, the integral intensity (c−a) can be considered to be a value derived from the methyl group in DL-alanine of the polyamide compound.

Accordingly, the amount (mol %) of the DL-alanine unit in the polyamide compound can be calculated according to the following formula:

Amount of DL-Alanine Unit in Polyamide Compound (mol %) = [Numerical Formula 1]

$$[(c-a)/3]/[(c/13)+d/4] \times 100$$

The above calculation identifies the existence of DL-alanine in an amount of about 5.3 mol % (4.49 mol % as calculated) in the polyamide compound 101. Accordingly, the polyamide compound 101 was identified to be 1,3-BAC unit/adipic acid unit/DL-alanine unit=47.3/47.4/5.3 (ratio by mol %).

Also in the following Examples and Comparative Examples, the prepared polyamide compounds were analyzed and quantified for the constituent thereof in the same manner as above.

(Production of Unstretched Film of Polyamide Compound)

Pellets of the polyamide compound 101 were formed into a film through a 25-mmφ single-screw extruder at an extrusion temperature of 260° C., a screw revolution number of 60 rpm and a taking-up rate of 1.2 m/min, thereby producing an unstretched film having a width of 200 mm and a thickness of from 95 to 105 µm.

Example 102

A DL-alanine-copolymerized N-1,3-BAC6 (polyamide compound 102; 1,3-BAC unit/adipic acid unit/DL-alanine unit=44.4/44.5/11.1 (ratio by mol %)) and an unstretched film were produced according to the same process as in Example 101 except that the amount of DL-alanine added was changed so that the content thereof in the polyamide compound could be 11.1 mol %.

Example 103

A DL-alanine-copolymerized N-1,3-BAC6 (polyamide compound 103; 1,3-BAC unit/adipic acid unit/DL-alanine unit=37.4/37.6/25.0 (ratio by mol %)) was produced according to the same process as in Example 101 except that the amount of DL-alanine added was changed so that the content thereof in the polyamide compound could be 25 mol %. In this, since the molecular weight of the compound could not increase fully during polymerization, the compound was not tested for the tensile strength at break and the haze value of the unstretched film thereof.

Example 104

A DL-2-aminobutyric acid-copolymerized N-1,3-BAC6 (polyamide compound 104; 1,3-BAC unit/adipic acid unit/DL-2-aminobutyric acid unit=47.3/47.4/5.3 (ratio by mol %)) and an unstretched film were produced according to the same process as in Example 101 except that the α-amino acid was changed to DL-2-aminobutyric acid (DL-AABA, by Nippon Finechem, pure product).

Example 105

A DL-phenylalanine-copolymerized N-1,3-BAC6 (polyamide compound 105; 1,3-BAC unit/adipic acid unit/DL-phenylalanine unit=47.3/47.4/5.3 (ratio by mol %)) and an unstretched film were produced according to the same process as in Example 101 except that the α-amino acid was changed to DL-phenylalanine (DL-Phe, by Sinogel Amino Acid Co., Ltd.).

Example 106

A DL-alanine-copolymerized N-1,4-BAC6 (polyamide compound 106; 1,4-BAC unit/adipic acid unit/DL-alanine unit=47.3/47.4/5.3 (ratio by mol %)) and an unstretched film were produced according to the same process as in Example 101 except that 1,3-bis(aminomethyl)cyclohexane was changed to 1,4-bis(aminomethyl)cyclohexane by Mitsubishi Gas Chemical, abbreviated as "1,4-BAC").

Example 107

A DL-alanine/isophthalic acid-copolymerized N-1,3-BAC6 (polyamide compound 107; 1,4-BAC unit/adipic acid unit/isophthalic acid unit/DL-alanine unit=47.3/42.7/4.7/5.3 (ratio by mol %)) and an unstretched film were produced according to the same process as in Example 101 except that isophthalic acid (IA, by AG International Chemical) was further copolymerized as an aromatic dicarboxylic acid in a copolymerization ratio of 4.7 mol %.

Example 108

A DL-alanine-copolymerized N-1,3-BAC10 (polyamide compound 108; 1,3-BAC unit/sebacic acid unit/DL-alanine unit=47.3/47.4/5.3 (ratio by mol %)) and an unstretched film were produced according to the same process as in Example 101 except that adipic acid was changed to sebacic acid (by Itoh Oil Chemicals).

Comparative Example 101

(Melt Polymerization for Polyamide Compound According to Normal-Pressure Instillation Method)

13000 g (89.0 mol) of accurately-weighed adipic acid (by Asahi Kasei Chemicals), 11.5 g (0.11 mol) of sodium hypophosphite and 5.96 g (0.073 mol) of sodium acetate were put into a reactor having an internal volume of 50 liters and equipped with a stirrer, a partial condenser, a complete condenser, a thermometer, a dropping funnel, a nitrogen-introducing duct and a strand die, fully purged with nitrogen, and then heated up to 170° C. while the system was stirred with a small amount of nitrogen current applied thereto. 12437 g (88.7 mol) of 1,3-bis(aminomethyl)cyclohexane (by Mitsubishi Gas Chemical) was dropwise added thereto with stirring, and while the formed condensation water was removed out of the system, the system was continuously heated. After the addition of 1,3-bis(aminomethyl)cyclohexane, the internal temperature was kept at 260° C. and the reaction was continued for 40 minutes. Subsequently, the system was pressurized with nitrogen, and the polymer was taken out through the strand die, and pelletized. About 23 kg of a polyamide compound was thus obtained.

(Solid-Phase Polymerization of Polyamide Compound)

Next, the polyamide compound was fed into a jacketed tumble drier equipped with a nitrogen-introducing duct, a vacuum line, a vacuum pump and a thermocouple for internal temperature measurement, and while rotated at a constant speed, the inside of the tumble drier was fully purged with a nitrogen gas having a purity of at least 99% by volume, and then the tumble drier was heated in the nitrogen gas current atmosphere to thereby elevate the temperature of the pellets up to 150° C. taking about 150 minutes. At the time when the temperature of the pellets reached 150° C., the internal pressure was reduced to 1 Torr or less. This was further heated so that the temperature of the pellets could reach 190° C. taking about 70 minutes, and then this was kept at 190° C. for 30 minutes. Next, a nitrogen gas having a purity of at least 99% by volume was introduced into the system, and while the tumble drier was kept rotated, this was cooled to give N-1,3-BAC6 (polyamide compound 109).

(Production of Unstretched Film of Polyamide Compound)

Pellets of the polyamide compound 109 were formed into a film through a 25-mmφ single-screw extruder at an extrusion temperature of 260° C., a screw revolution number of 60 rpm and a taking-up rate of 1.2 m/min, thereby producing an unstretched film having a width of 200 mm and a thickness of from 95 to 105 μm.

Comparative Example 102

An N-1,4-BAC6 (polyamide compound 110) and an unstretched film were produced according to the same process as in Comparative Example 101 except that adipic acid was changed to 1,4-bis(aminomethyl)cyclohexane (1,4-BAC) having a cis-form/trans-form ratio of 70/30 (mol %) (by Mitsubishi Gas Chemical).

Comparative Example 103

A glycine-copolymerized N-1,3-BAC6 (polyamide compound 111; 1,3-BAC unit/adipic acid unit/glycine unit=47.3/47.4/5.3 ratio by mol %)) and an unstretched film were produced according to the same process as in Example 101 except that DL-alanine was changed to glycine having a secondary hydrogen at the α-position thereof (by Tokyo Chemical Industry).

Comparative Example 104

A 2-amino-2-methylpropanoic acid-copolymerized N-1,3-BAC6 (polyamide compound 112; 1,3-BAC unit/adipic acid unit/2-aminomethylpropanoic acid unit=47.3/47.4/5.3 ratio by mol %)) and an unstretched film were produced according to the same process as in Example 101 except that DL-alanine was changed to 2-aminoisobutyric acid not having a hydrogen at the α-position thereof (2-amino-2-methylpropanoic acid, by Nippon Finechem, pure product).

Comparative Example 105

An isophthalic acid-copolymerized N-1,3-BAC6 (polyamide compound 113; 1,3-BAC unit/adipic acid unit/isophthalic acid unit=49.9/45.1/5.0 ratio by mol %)) and an unstretched film were produced according to the same process as in Comparative Example 101 except that isophthalic acid (AG International Chemical) was further copolymerized as an aromatic dicarboxylic acid in a copolymerization ratio of 5 mol %.

Comparative Example 106

An N-1,3-BAC 10 (polyamide compound 114) and an unstretched film were produced according to the same process as in Comparative Example 101 except that adipic acid was changed to sebacic acid (by Itoh Oil Chemicals).

Comparative Example 107

Cobalt stearate was added to the polyamide compound 109 in such a manner that the cobalt content in the composition could be 400 ppm, and dry-blended. The resulting blend was formed into a film through a 30-mmϕ double-screw extruder at an extrusion temperature of 260° C., a screw revolution number of 60 rpm, a feed-screw revolution number of 12 rpm, and a taking-up rate of 1.8 m/min, thereby producing an unstretched film having a width of 200 mm and a thickness of from 95 to 105 µm.

Comparative Example 108

5 parts by mass of maleic acid-modified polybutadiene (PB) (by Nippon Petrochemical, trade name: M-2000-20) and cobalt stearate were added to 100 parts by mass of the polyamide compound 109 in such a manner that the cobalt content in the composition could be 400 ppm, and dry-blended. The resulting blend was formed into a film through a 30-mmϕ double-screw extruder at an extrusion temperature of 260° C., a screw revolution number of 60 rpm, a feed-screw revolution number of 14 rpm, and a taking-up rate of 2.0 m/min, thereby producing an unstretched film having a width of 200 mm and a thickness of from 95 to 105 µm.

Comparative Example 109

DL-alanine (by Musashino Chemical Laboratory) was added to the polyamide compound 109 in such a manner that the DL-alanine content in the composition could be 5% by mass, and dry-blended. While so controlled as not to copolymerize with each other, the resulting blend was formed into a film through a small-size a 15-mmϕ single-screw extruder at an extrusion temperature of 240° C., a screw revolution number of 30 rpm, a feed-screw revolution number of 14 rpm, and a taking-up rate of 1.0 m/min, thereby producing an unstretched film having a width of 110 mm and a thickness of from 95 to 105 µm.

TABLE 1

| | Polyamide Compound | Amino Acid Content (mol %) | Relative Viscosity | Tg (° C.) | Oxygen Absorption Amount (cc/g) 40° C., after 28 days | Oxygen Transmission Coefficient (cc·mm/(m²·day·atm)) | Organoleptic Test Evaluation | Tensile Strength at break (MPa) Before oxygen absorption | Tensile Strength at break (MPa) After oxygen absorption | Haze |
|---|---|---|---|---|---|---|---|---|---|---|
| Example 101 | DL-alanine-copolymerized N-1,3-BAC6 | 5.3 | 2.6 | 105 | 11 | 0.06 | 1 | 65 | 60 | 1.1 |
| Example 102 | DL-alanine-copolymerized N-1,3-BAC6 | 11.1 | 2.4 | 105 | 20 | 0.04 | 1 | 65 | 61 | 1.2 |
| Example 103 | DL-alanine-copolymerized N-1,3-BAC6 | 25.0 | 1.4 | 105 | 43 | — | 1 | — | — | — |
| Example 104 | DL-AABA*[1)]-copolymerized N-1,3-BAC6 | 5.3 | 2.6 | 105 | 9 | 0.06 | 1 | 64 | 59 | 1.2 |
| Example 105 | DL-Phe*[2)]-copolymerized N-1,3-BAC6 | 5.3 | 2.6 | 105 | 10 | 0.06 | 1 | 65 | 61 | 1.1 |
| Example 106 | DL-alanine-copolymerized N-1,4-BAC6 | 5.3 | 2.6 | 107 | 10 | 0.07 | 1 | 71 | 65 | 1.1 |
| Example 107 | DL-alanine/IA*[3)]-copolymerized N-1,3-BAC6 | 5.3 | 2.3 | 112 | 8 | 0.08 | 1 | 65 | 60 | 1.3 |
| Example 108 | DL-alanine-copolymerized N-1,3-BAC10 | 5.3 | 2.5 | 74 | 6 | 0.2 | 1 | 65 | 60 | 0.7 |
| Comparative Example 101 | N-1,3-BAC6 | 0.0 | 2.6 | 103 | 0 | 0.15 | 1 | 65 | 65 | 1.5 |
| Comparative Example 102 | N-1,4-BAC6 | 0.0 | 2.6 | 104 | 0 | 0.12 | 1 | 71 | 65 | 1.4 |
| Comparative Example 103 | glycine-copolymerized N-1,3-BAC6 | 5.3 | 2.4 | 104 | 2 | 0.15 | 1 | 65 | 63 | 1.8 |
| Comparative Example 104 | AIB*[4)]-copolymerized N-1,3-BAC6 | 5.3 | 2.4 | 104 | 0 | 0.15 | 1 | 65 | 65 | 1.7 |
| Comparative Example 105 | IA*[3)]-copolymerized N-1,3-BAC6 | 0.0 | 2.6 | 108 | 0 | 0.13 | 1 | 63 | 63 | 1.5 |
| Comparative Example 106 | N-1,3-BAC10 | 0.0 | 2.4 | 74 | 0 | 0.5 | 1 | 53 | 53 | 0.7 |
| Comparative Example 107 | N-1,3-BAC6 (Co mixed)*[5)] | 0.0 | 2.5 | 104 | 3 | 0.13 | 2 | 65 | 48 | 1.8 |
| Comparative Example 108 | N-1,3-BAC6 (Co + PB) mixed)*[6)] | 0.0 | 2.4 | 104 | 7 | 0.1 | 3 | 65 | 45 | 2.3 |
| Comparative Example 109 | N-1,3-BAC6 (DL-alanine mixed)*[7)] | 0.0 | 2.4 | 104 | 0 | 0.15 | 1 | 65 | 62 | 1.3 |

*[1)]DL-AABA: DL-2-aminobutyric acid
*[2)]DL-Phe: DL-phenylalanine
*[3)]IA: isophthalic acid
*[4)]AIB: 2-aminoisobutyric acid
*[5)]Co 400 ppm was mixed.
*[6)]Co 400 ppm and maleic acid-modified polybutadiene 5 parts by mass were mixed
*[7)]DL-alanine 5% by mass was mixed.

The polyamide compound copolymerized with an α-amino acid not having a tertiary hydrogen was insufficient in the oxygen absorption performance (Comparative Examples 103 and 104). The composition prepared by mixing a cobalt compound with the polyamide compound not copolymerized with an α-amino acid exhibited oxygen absorption performance and a good oxygen transmission coefficient and was transparent; however, as a cobalt compound was added thereto, the composition was bluish and generated more offensive odor than a composition with polybutadiene. Further, after having absorbed oxygen, the film deteriorated and could not keep its shape; and accordingly, the composition is not always favorable for use as packaging materials or packaging containers (Comparative Examples 107, 108). The composition not copolymerized with an α-amino acid having a tertiary hydrogen but merely mixed with a polyamide not copolymerized with an α-amino acid did not exhibit oxygen absorption performance (Comparative Example 109).

As opposed to these, the polyamide compound copolymerized with a tertiary hydrogen-having α-amino acid exhibited sufficient oxygen absorption performance though not using a metal, and in addition, did not generate any offensive odor (Examples 101 to 108). In particular, the film samples had a good oxygen transmission coefficient and were transparent, and after having absorbed oxygen, they still kept the mechanical properties thereof (Examples 101 to 102, and 104 to 108).

Examples 201 to 216 and Comparative Examples 201 to 203

(Melt Polymerization for Polyamide Compound According to Normal-Pressure Instillation Method)

Polyamide compounds of Examples 201 to 216 and Comparative Examples 201 to 203 were produced as follows: An aliphatic dicarboxylic acid, an aromatic dicarboxylic acid, an amino acid, sodium hypophosphite and sodium acetate as in Table 2 were put into a reactor having an internal volume of 50 liters and equipped with a stirrer, a partial condenser, a complete condenser, a thermometer, a dropping funnel, a nitrogen-introducing duct and a strand die, fully purged with nitrogen, and then heated up to 170° C. while the system was stirred with a small amount of nitrogen current applied thereto. 1,3-Bis(aminomethyl)cyclohexane having a cis-form/trans-form ratio of 74/26 (mol %) (abbreviated as 1,3-BAC) was dropwise added thereto with stirring, and while the formed condensation water was removed out of the system, the system was continuously heated. After the addition of 1,3-BAC, the internal temperature was kept at 240° C. and the reaction was continued for 40 to 60 minutes while attention was paid to the increasing degree of the stirring torque. Subsequently, the system was pressurized with nitrogen, and the polymer was taken out through the strand die, and pelletized. About 23 kg of a polyamide compound was thus obtained.

(Production of Unstretched Film of Polyamide Compound)

Pellets of the polyamide compound obtained in Examples 201 to 216 and Comparative Examples 201 to 203 were dried in vacuum at 120° C. for 6 hours, and then formed into a film through a 25-mmφ single-screw extruder at an extrusion temperature of 245° C., a screw revolution number of 60 rpm and a taking-up rate of 1.2 m/min, thereby producing an unstretched film having a width of 200 mm and a thickness of from 95 to 105 μm.

TABLE 2

|  |  |  | Example 201 | Example 202 | Example 203 | Example 204 | Example 205 | Example 206 | Example 207 | Example 208 | Example 209 |
|---|---|---|---|---|---|---|---|---|---|---|---|
| Diamine | 1,3-BAC | g | 13000 | 12500 | 11500 | 10500 | 9500 | 12000 | 12000 | 11500 | 11500 |
|  |  | mol | 92.70 | 89.14 | 82.01 | 74.88 | 67.75 | 85.57 | 85.57 | 82.01 | 82.01 |
| Aliphatic Dicarboxylic Acid | adipic acid | g | 12122 | 10132 | 8989 | 7816 | 6600 | 6948 | 4169 | 8989 | 9321 |
|  |  | mol | 82.95 | 69.33 | 61.51 | 53.48 | 45.16 | 47.54 | 28.52 | 61.51 | 63.78 |
|  | sebacic acid | g |  |  |  |  |  |  |  |  |  |
|  |  | mol |  |  |  |  |  |  |  |  |  |
|  | dodecanedioic acid | g |  |  |  |  |  |  |  |  |  |
|  |  | mol |  |  |  |  |  |  |  |  |  |
| Aromatic Dicarboxylic Acid | isophthalic acid | g | 1621 | 3291 | 3406 | 3554 | 3752 | 6319 | 9478 | 3406 | 3028 |
|  |  | mol | 9.76 | 19.81 | 20.50 | 21.39 | 22.58 | 38.03 | 57.05 | 20.50 | 18.22 |
|  | terephthalic acid | g |  |  |  |  |  |  |  |  |  |
|  |  | mol |  |  |  |  |  |  |  |  |  |
|  | 2,6-naphthalenedicarboxylic acid | g |  |  |  |  |  |  |  |  |  |
|  |  | mol |  |  |  |  |  |  |  |  |  |
| Amino Acid | DL-alanine | g | 869 | 1765 | 3653 | 5718 | 8047 | 1694 | 1694 |  |  |
|  |  | mol | 9.76 | 19.81 | 41.00 | 64.18 | 90.33 | 19.02 | 19.02 |  |  |
|  | DL-2-aminobutyric acid | g |  |  |  |  |  |  |  | 4228 |  |
|  |  | mol |  |  |  |  |  |  |  | 41.00 |  |
|  | DL-phenylalanine | g |  |  |  |  |  |  |  |  | 3010 |
|  |  | mol |  |  |  |  |  |  |  |  | 18.22 |
|  | glycine | g |  |  |  |  |  |  |  |  |  |
|  |  | mol |  |  |  |  |  |  |  |  |  |
|  | 2-aminoisobutyric acid | g |  |  |  |  |  |  |  |  |  |
|  |  | mol |  |  |  |  |  |  |  |  |  |
| Additive | sodium hypophosphite | g | 8.25 | 8.25 | 8.16 | 8.12 | 8.16 | 8.05 | 8.18 | 8.36 | 8.07 |
|  |  | mmol | 78 | 78 | 77 | 77 | 77 | 76 | 77 | 79 | 76 |
|  | sodium acetate | g | 5.74 | 5.74 | 5.69 | 5.66 | 5.68 | 5.61 | 5.70 | 5.82 | 5.62 |
|  |  | mmol | 70 | 70 | 69 | 69 | 69 | 68 | 70 | 71 | 69 |
| Compositional Ratio of Monomers | diamine | mol % | 47.5 | 45.0 | 40.0 | 35.0 | 30.0 | 45.0 | 45.0 | 40.0 | 45.0 |
|  | aliphatic dicarboxylic acid | mol % | 42.5 | 35.0 | 30.0 | 25.0 | 20.0 | 25.0 | 15.0 | 30.0 | 35.0 |
|  | aromatic dicarboxylic acid | mol % | 5.0 | 10.0 | 10.0 | 10.0 | 10.0 | 20.0 | 30.0 | 10.0 | 10.0 |
|  | amino acid | mol % | 5.0 | 10.0 | 20.0 | 30.0 | 40.0 | 10.0 | 10.0 | 20.0 | 10.0 |

TABLE 2-continued

| | | | | | | | | | | |
|---|---|---|---|---|---|---|---|---|---|---|
| aliphatic dicarboxylic acid/(aliphatic dicarboxylic acid + aromatic dicarboxylic acid) (ratio by mol) | | | 89.5 | 77.8 | 75.0 | 71.4 | 66.7 | 55.6 | 33.3 | 75.0 | 77.8 |
| aromatic dicarboxylic acid/(aliphatic dicarboxylic acid + aromatic dicarboxylic acid) (ratio by mol) | | | 10.5 | 22.2 | 25.0 | 28.6 | 33.3 | 44.4 | 66.7 | 25.0 | 22.2 |
| Amino Acid Content | | mol % | 5.1 | 9.6 | 19.2 | 28.8 | 39.1 | 10.0 | 10.2 | 19.4 | 9.8 |
| Relative Viscosity | | | 2.0 | 1.9 | 1.9 | 1.8 | 1.8 | 2.1 | 2.2 | 2.0 | 2.1 |
| Tm | | °C. | 211 | 202 | 193 | N.D. | N.D. | 191 | N.D. | 192 | 201 |
| Oxygen Absorption Amount (40° C., 100% RH, 28 days) | | cc/g | 8 | 17 | 30 | 42 | 49 | 20 | 21 | 27 | 14 |

| | | | Example 210 | Example 211 | Example 212 | Example 213 | Example 214 | Example 215 | Example 216 | Comp. Example 201 |
|---|---|---|---|---|---|---|---|---|---|---|
| Diamine | 1,3-BAC | g | 10500 | 10000 | 12500 | 11500 | 12000 | 11000 | 10000 | 13000 |
| | | mol | 74.88 | 71.31 | 89.14 | 82.01 | 85.57 | 78.44 | 71.31 | 92.07 |
| Aliphatic Dicarboxylic Acid | adipic acid | g | | | 10132 | 8989 | 9727 | 8598 | | 10838 |
| | | mol | | | 69.33 | 61.51 | 66.56 | 58.83 | | 74.16 |
| | sebacic acid | g | 11779 | 10817 | | | | | | |
| | | mol | 58.24 | 53.48 | | | | | | |
| | dodecanedioic acid | g | | | | | | | 12774 | |
| | | mol | | | | | | | 55.46 | |
| Aromatic Dicarboxylic Acid | isophthalic acid | g | 2765 | 2962 | | | | | 2633 | 3080 |
| | | mol | 16.64 | 17.83 | | | | | 15.85 | 18.54 |
| | terephthalic acid | g | | | 3291 | 3406 | | | | |
| | | mol | | | 19.81 | 20.50 | | | | |
| | 2,6-naphthalenedicarboxylic acid | g | | | | | 4111 | 4240 | | |
| | | mol | | | | | 19.02 | 19.61 | | |
| Amino Acid | DL-alanine | g | 1482 | 3177 | 1765 | 3653 | 1694 | 3494 | 1412 | |
| | | mol | 16.64 | 35.66 | 19.81 | 41.00 | 19.02 | 39.22 | 15.85 | |
| | DL-2-aminobutyric acid | g | | | | | | | | |
| | | mol | | | | | | | | |
| | DL-phenylalanine | g | | | | | | | | |
| | | mol | | | | | | | | |
| | glycine | g | | | | | | | | |
| | | mol | | | | | | | | |
| | 2-aminoisobutyric acid | g | | | | | | | | |
| | | mol | | | | | | | | |
| Additive | sodium hypophosphite | g | 8.05 | 8.13 | 8.25 | 8.16 | 8.25 | 8.14 | 8.20 | 8.07 |
| | | mmol | 76 | 77 | 78 | 77 | 78 | 77 | 77 | 76 |
| | sodium acetate | g | 5.61 | 5.66 | 5.74 | 5.69 | 5.75 | 5.67 | 5.71 | 5.62 |
| | | mmol | 68 | 69 | 70 | 69 | 70 | 69 | 70 | 69 |
| Compositional Ratio of Monomers | Diamine | mol % | 45.0 | 40.0 | 45.0 | 40.0 | 45.0 | 40.0 | 45.0 | 50.0 |
| | aliphatic dicarboxylic acid | mol % | 35.0 | 30.0 | 35.0 | 30.0 | 35.0 | 30.0 | 35.0 | 40.0 |
| | aromatic dicarboxylic acid | mol % | 10.0 | 10.0 | 10.0 | 10.0 | 10.0 | 10.0 | 10.0 | 10.0 |
| | amino acid | mol % | 10.0 | 20.0 | 10.0 | 20.0 | 10.0 | 20.0 | 10.0 | 0.0 |
| aliphatic dicarboxylic acid/(aliphatic dicarboxylic acid + aromatic dicarboxylic acid) (ratio by mol) | | | 77.8 | 75.0 | 77.8 | 75.0 | 77.8 | 75.0 | 77.8 | 80.0 |
| aromatic dicarboxylic acid/(aliphatic dicarboxylic acid + aromatic dicarboxylic acid) (ratio by mol) | | | 22.2 | 25.0 | 22.2 | 25.0 | 22.2 | 25.0 | 22.2 | 20.0 |
| Amino Acid Content | | mol % | 9.8 | 19.5 | 9.7 | 19.7 | 10.0 | 19.5 | 9.8 | 0.0 |
| Relative Viscosity | | | 2.1 | 2.0 | 2.1 | 2.0 | 2.1 | 2.0 | 2.0 | 2.2 |
| Tm | | °C. | 172 | 164 | 222 | 208 | 222 | 210 | 167 | 210 |
| Oxygen Absorption Amount (40° C., 100% RH, 28 days) | | cc/g | 18 | 31 | 18 | 31 | 20 | 34 | 20 | 0 |

| | | | Comp. Example 202 | Comp. Example 203 |
|---|---|---|---|---|
| Diamine | 1,3-BAC | g | 12500 | 12000 |
| | | mol | 89.14 | 85.57 |
| Aliphatic Dicarboxylic Acid | adipic acid | g | 10132 | 9727 |
| | | mol | 69.33 | 66.56 |
| | sebacic acid | g | | |
| | | mol | | |
| | dodecanedioic acid | g | | |
| | | mol | | |
| Aromatic Dicarboxylic Acid | isophthalic acid | g | 3291 | 3159 |
| | | mol | 19.81 | 19.02 |
| | terephthalic acid | g | | |
| | | mol | | |
| | 2,6-naphthalenedicarboxylic acid | g | | |
| | | mol | | |

TABLE 2-continued

|  |  |  |  |  |
|---|---|---|---|---|
| Amino Acid | DL-alanine | g |  |  |
|  |  | mol |  |  |
|  | DL-2-aminobutyric acid | g |  |  |
|  |  | mol |  |  |
|  | DL-phenylalanine | g |  |  |
|  |  | mol |  |  |
|  | glycine | g | 1487 |  |
|  |  | mol | 19.81 |  |
|  | 2-aminoisobutyric acid | g |  | 1961 |
|  |  | mol |  | 19.02 |
| Additive | sodium hypophosphite | g | 8.16 | 8.02 |
|  |  | mmol | 77 | 76 |
|  | sodium acetate | g | 5.68 | 5.58 |
|  |  | mmol | 69 | 68 |
| Compositional | Diamine | mol % | 45.0 | 45.0 |
| Ratio of | aliphatic dicarboxylic acid | mol % | 35.0 | 35.0 |
| Monomers | aromatic dicarboxylic acid | mol % | 10.0 | 10.0 |
|  | amino acid | mol % | 10.0 | 10.0 |
| aliphatic dicarboxylic acid/(aliphatic dicarboxylic acid + aromatic dicarboxylic acid) (ratio by mol) |  |  | 77.8 | 77.8 |
| aromatic dicarboxylic acid/(aliphatic dicarboxylic acid + aromatic dicarboxylic acid) (ratio by mol) |  |  | 22.2 | 22.2 |
| Amino Acid Content |  | mol % | 10.0 | 9.8 |
| Relative Viscosity |  |  | 2.0 | 2.0 |
| Tm |  | ° C. | 200 | 201 |
| Oxygen Absorption Amount (40° C., 100% RH, 28 days) |  | cc/g | 0 | 0 |

*N.D. = Not detected.

The polyamide compound copolymerized with an α-amino acid not having a tertiary hydrogen was insufficient in the oxygen absorption performance (Comparative Examples 202 and 203).

As opposed to these, the polyamide compound copolymerized with a tertiary hydrogen-having α-amino acid exhibited sufficient oxygen absorption performance though not using a metal, and depending on the molar ratio of the α-amino acid to be copolymerized, the oxygen absorption performance of the compound could be controlled.

Examples 301 to 316, and Comparative Examples 301 to 303

(Melt Polymerization for Polyamide Compound According to Normal-Pressure Instillation Method)

Polyamide compounds of Examples 301 to 316 and Comparative Examples 301 to 303 were produced as follows: A dicarboxylic acid, an aminocarboxylic acid, an amino acid, sodium hypophosphite and sodium acetate as in Table 3 were put into a reactor having an internal volume of 50 liters and equipped with a stirrer, a partial condenser, a complete condenser, a thermometer, a dropping funnel, a nitrogen-introducing duct and a strand die, fully purged with nitrogen, and then heated up to 170° C. while the system was stirred with a small amount of nitrogen current applied thereto. 1,3-Bis (aminomethyl)cyclohexane having a cis-form/trans-form ratio of 74/26 (mol %) (abbreviated as 1,3-BAC) was dropwise added thereto with stirring, and while the formed condensation water was removed out of the system, the system was continuously heated. After the addition of 1,3-BAC, the internal temperature was kept at 245° C. and the reaction was continued for 40 minutes. Subsequently, the system was pressurized with nitrogen, and the polymer was taken out through the strand die, and pelletized. About 23 kg of a polyamide compound was thus obtained.

(Production of Unstretched Film of Polyamide Compound)

Pellets of the polyamide compound obtained in Examples 301 to 316 and Comparative Examples 301 to 303 were dried in vacuum at 120° C. for 6 hours, and then formed into a film through a 25-mmφ single-screw extruder at an extrusion temperature of 245° C., a screw revolution number of 60 rpm and a taking-up rate of 1.2 m/min, thereby producing an unstretched film having a width of 200 mm and a thickness of from 95 to 105 μm.

TABLE 3

|  |  |  | Example 301 | Example 302 | Example 303 | Example 304 | Example 305 | Example 306 | Example 307 | Example 308 | Example 309 |
|---|---|---|---|---|---|---|---|---|---|---|---|
| Diamine | 1,3-BAC | g | 12000 | 11000 | 10000 | 9000 | 8000 | 10000 | 8500 | 10000 | 10500 |
|  |  | mol | 85.57 | 78.44 | 71.31 | 64.18 | 57.05 | 71.31 | 60.61 | 71.31 | 74.88 |
| Dicarboxylic Acid | adipic acid | g | 12506 | 11464 | 10422 | 9379 | 8337 | 10422 | 8858 | 10422 | 10943 |
|  |  | mol | 85.57 | 78.44 | 71.31 | 64.18 | 57.05 | 71.31 | 60.61 | 71.31 | 74.88 |
|  | sebacic acid | g |  |  |  |  |  |  |  |  |  |
|  |  | mol |  |  |  |  |  |  |  |  |  |
|  | dodecanedioic acid | g |  |  |  |  |  |  |  |  |  |
|  |  | mol |  |  |  |  |  |  |  |  |  |
| ω-Amino-carboxylic Acid | 6-aminohexanoic acid | g | 1247 | 2572 | 2673 | 2862 | 2993 | 5345 | 7951 | 2673 | 2455 |
|  |  | mol | 9.51 | 19.61 | 20.37 | 21.39 | 22.82 | 40.75 | 60.61 | 20.37 | 18.72 |
|  | 8-aminooctanoic acid | g |  |  |  |  |  |  |  |  |  |
|  |  | mol |  |  |  |  |  |  |  |  |  |
|  | 12-aminododecanoic acid | g |  |  |  |  |  |  |  |  |  |
|  |  | mol |  |  |  |  |  |  |  |  |  |

TABLE 3-continued

| | | | | | | | | | | | |
|---|---|---|---|---|---|---|---|---|---|---|---|
| Amino Acid | DL-alanine | g | 847 | 1747 | 3630 | 5718 | 8132 | 1815 | 1800 | | |
| | | mol | 9.51 | 19.61 | 40.75 | 64.18 | 91.28 | 20.37 | 20.20 | | |
| | DL-2-aminobutyric acid | g | | | | | | | | 4202 | |
| | | mol | | | | | | | | 40.75 | |
| | DL-phenylalanine | g | | | | | | | | | 3092 |
| | | mol | | | | | | | | | 18.72 |
| | glycine | g | | | | | | | | | |
| | | mol | | | | | | | | | |
| | 2-aminoisobutyric acid | g | | | | | | | | | |
| | | mol | | | | | | | | | |
| Additive | sodium hypophosphite | g | 7.93 | 7.96 | 7.89 | 7.89 | 7.99 | 8.18 | 8.03 | 8.09 | 8.08 |
| | | mmol | 75 | 75 | 74 | 74 | 75 | 77 | 76 | 76 | 76 |
| | sodium acetate | g | 5.52 | 5.54 | 5.50 | 5.49 | 5.57 | 5.70 | 5.59 | 5.63 | 5.63 |
| | | mmol | 67 | 68 | 67 | 67 | 68 | 70 | 68 | 69 | 69 |
| Compositional Ratio of Monomers | diamine | mol % | 45.0 | 40.0 | 35.0 | 30.0 | 25.0 | 35.0 | 30.0 | 35.0 | 40.0 |
| | dicarboxylic acid | mol % | 45.0 | 40.0 | 35.0 | 30.0 | 25.0 | 35.0 | 30.0 | 35.0 | 40.0 |
| | ω-aminocarboxylic acid | mol % | 5.0 | 10.0 | 10.0 | 10.0 | 10.0 | 20.0 | 30.0 | 10.0 | 10.0 |
| | amino acid | mol % | 5.0 | 10.0 | 20.0 | 30.0 | 40.0 | 10.0 | 10.0 | 20.0 | 10.0 |
| Amino Acid Content (mol %) | | mol % | 4.9 | 9.8 | 19.5 | 29.1 | 38.9 | 9.7 | 9.7 | 19.7 | 9.9 |
| Relative Viscosity | | | 2.0 | 1.9 | 1.9 | 1.9 | 1.8 | 2.0 | 1.9 | 1.9 | 2.0 |
| Tm | | ° C. | 218 | 207 | 199 | N.D. | 178 | 184 | N.D. | 198 | 209 |
| Oxygen Absorption Amount (40° C., 100% RH, 28 days) | | cc/g | 12 | 22 | 35 | 48 | 55 | 24 | 26 | 32 | 19 |

| | | | Example 310 | Example 311 | Example 312 | Example 313 | Example 314 | Example 315 | Example 316 | Comp. Example 301 |
|---|---|---|---|---|---|---|---|---|---|---|
| Diamine | 1,3-BAC | g | 9500 | 8500 | 11000 | 10000 | 10500 | 9500 | 9000 | 12000 |
| | | mol | 67.75 | 60.61 | 78.44 | 71.31 | 74.88 | 67.75 | 64.18 | 85.57 |
| Dicarboxylic Acid | adipic acid | g | | | 11464 | 10422 | 10943 | 9900 | | 12506 |
| | | mol | | | 78.44 | 71.31 | 74.88 | 67.75 | | 85.57 |
| | sebacic acid | g | 13702 | 12259 | | | | | | |
| | | mol | 67.75 | 60.61 | | | | | | |
| | dodecanedioic acid | g | | | | | | | 14781 | |
| | | mol | | | | | | | 64.18 | |
| ω-Aminocarboxylic Acid | 6-aminohexanoic acid | g | 2222 | 2272 | | | | | 2105 | 2494 |
| | | mol | 16.94 | 17.32 | | | | | 16.05 | 19.02 |
| | 8-aminooctanoic acid | g | | | 3123 | 3244 | | | | |
| | | mol | | | 19.61 | 20.37 | | | | |
| | 12-aminododecanoic acid | g | | | | | 4031 | 4168 | | |
| | | mol | | | | | 18.72 | 19.36 | | |
| Amino Acid | DL-alanine | g | 1509 | 3086 | 1747 | 3630 | 1668 | 3449 | 1430 | |
| | | mol | 16.94 | 34.64 | 19.61 | 40.75 | 18.72 | 38.71 | 16.05 | |
| | DL-2-aminobutyric acid | g | | | | | | | | |
| | | mol | | | | | | | | |
| | DL-phenylalanine | g | | | | | | | | |
| | | mol | | | | | | | | |
| | glycine | g | | | | | | | | |
| | | mol | | | | | | | | |
| | 2-aminoisobutyric acid | g | | | | | | | | |
| | | mol | | | | | | | | |
| Additive | sodium hypophosphite | g | 8.17 | 7.87 | 8.15 | 8.09 | 8.13 | 8.05 | 8.36 | 8.07 |
| | | mmol | 77 | 74 | 77 | 76 | 77 | 76 | 79 | 76 |
| | sodium acetate | g | 5.69 | 5.48 | 5.67 | 5.63 | 5.67 | 5.61 | 5.82 | 5.62 |
| | | mmol | 69 | 67 | 69 | 69 | 69 | 68 | 71 | 69 |
| Compositional Ratio of Monomers | diamine | mol % | 40.0 | 35.0 | 40.0 | 35.0 | 40.0 | 35.0 | 40.0 | 45.0 |
| | dicarboxylic acid | mol % | 40.0 | 35.0 | 40.0 | 35.0 | 40.0 | 35.0 | 40.0 | 45.0 |
| | ω-aminocarboxylic acid | mol % | 10.0 | 10.0 | 10.0 | 10.0 | 10.0 | 10.0 | 10.0 | 10.0 |
| | amino acid | mol % | 10.0 | 20.0 | 10.0 | 20.0 | 10.0 | 20.0 | 10.0 | 0 |
| Amino Acid Content | | mol % | 9.7 | 19.4 | 9.8 | 19.6 | 9.8 | 19.8 | 9.5 | 0 |
| Relative Viscosity | | | 1.9 | 1.9 | 1.9 | 1.8 | 1.9 | 1.8 | 1.9 | 2.0 |
| Tm | | ° C. | 161 | N.D. | 200 | 191 | 179 | N.D. | 148 | 222 |
| Oxygen Absorption Amount (40° C., 100% RH, 28 days) | | cc/g | 23 | 37 | 23 | 36 | 25 | 39 | 24 | 0 |

| | | | Comp. Example 302 | Comp. Example 303 |
|---|---|---|---|---|
| Diamine | 1,3-BAC | g | 11000 | 11000 |
| | | mol | 78.44 | 78.44 |
| Dicarboxylic Acid | adipic acid | g | 11464 | 11464 |
| | | mol | 78.44 | 78.44 |
| | sebacic acid | g | | |
| | | mol | | |

TABLE 3-continued

|  |  |  |  |  |  |
|---|---|---|---|---|---|
|  |  | dodecanedioic acid | g mol |  |  |
|  | ω-Aminocarboxylic Acid | 6-aminohexanoic acid | g mol | 2572 19.61 | 2572 19.61 |
|  |  | 8-aminooctanoic acid | g mol |  |  |
|  |  | 12-aminododecanoic acid | g mol |  |  |
|  | Amino Acid | DL-alanine | g mol |  |  |
|  |  | DL-2-aminobutyric acid | g mol |  |  |
|  |  | DL-phenylalanine | g mol |  |  |
|  |  | glycine | g mol | 1472 19.61 |  |
|  |  | 2-aminoisobutyric acid | g mol |  | 2022 19.61 |
|  | Additive | sodium hypophosphite | g mmol | 7.86 74 | 8.05 76 |
|  |  | sodium acetate | g mmol | 5.48 67 | 5.61 68 |
|  | Compositional Ratio of Monomers | diamine | mol % | 40.0 | 40.0 |
|  |  | dicarboxylic acid | mol % | 40.0 | 40.0 |
|  |  | ω-aminocarboxylic acid | mol % | 10.0 | 10.0 |
|  |  | amino acid | mol % | 10.0 | 10.0 |
|  | Amino Acid Content |  | mol % | 9.6 | 9.7 |
|  | Relative Viscosity |  |  | 1.9 | 1.9 |
|  | Tm |  | ° C. | 205 | 206 |
|  | Oxygen Absorption Amount (40° C., 100% RH, 28 days) |  | cc/g | 0 | 0 |

*N.D. = Not detected.

The polyamide compound copolymerized with an α-amino acid not having a tertiary hydrogen was insufficient in the oxygen absorption performance (Comparative Examples 302 and 303).

As opposed to these, the polyamide compound copolymerized with a tertiary hydrogen-having α-amino acid exhibited sufficient oxygen absorption performance though not using a metal, and depending on the molar ratio of the α-amino acid to be copolymerized, the oxygen absorption performance of the compound could be controlled.

Examples 401 to 403, and Comparative Examples 401 to 403

(Melt Polymerization for Polyamide Oligomer According to Normal-Pressure Instillation Method)

A dicarboxylic acid, an aromatic dicarboxylic acid, an α-amino acid, an ω-aminocarboxylic acid, sodium hypophosphite and sodium acetate of the type as in Table 4 were put into a reactor having an internal volume of 50 liters and equipped with a stirrer, a partial condenser, a complete condenser, a thermometer, a dropping funnel, a nitrogen-introducing duct and a strand die, in the amount as indicated in the Table, then fully purged with nitrogen, and heated up to 170° C. while the system was stirred with a small amount of nitrogen current applied thereto. 1,3-Bis(aminomethyl)cyclohexane having a cis-form/trans-form ratio of 74/26 (mol %) (abbreviated as 1,3-BAC) was dropwise added thereto with stirring, in the amount as indicated in the Table 4, and while the formed condensation water was removed out of the system, the system was continuously heated. After the addition of the diamine, the internal temperature was kept at 240° C. and the reaction was continued for 40 to 60 minutes, while attention was paid to the increasing degree of the stirring torque. Subsequently, the system was pressurized with nitrogen, and the polyamide oligomer was taken out through the strand die. The oligomer capable of being taken out as a strand was pelletized to give polyamide oligomer pellets. The oligomer that has a low molecular weight and therefore could not be taken out as a strand was separately ground with a grinder to give a ground polyamide oligomer.

TABLE 4

|  |  |  | Example 401 | Example 402 | Example 403 | Comparative Example 401 | Comparative Example 402 | Comparative Example 403 |
|---|---|---|---|---|---|---|---|---|
| Alicyclic Diamine | 1,3-BAC | g | 12000 | 12000 | 11515 | 12000 | 12000 | 11515 |
|  |  | mol | 85.6 | 85.6 | 82.1 | 85.6 | 86.0 | 82.1 |
| Aliphatic Dicarboxylic Acid | adipic acid | g | 12506 | 10943 | 12000 | 12506 | 11255 | 12000 |
|  |  | mol | 85.6 | 74.9 | 82.1 | 85.6 | 77.02 | 82.1 |
| Aromatic Dicarboxylic Acid | isophthalic acid | g |  | 1777 |  |  | 1422 |  |
|  |  | mol |  | 10.7 |  |  | 8.6 |  |
| Amino Acid | DL-alanine | g | 1906 | 1906 | 1829 |  |  |  |
|  |  | mol | 21.4 | 21.4 | 20.5 |  |  |  |

TABLE 4-continued

|  |  |  | Example 401 | Example 402 | Example 403 | Comparative Example 401 | Comparative Example 402 | Comparative Example 403 |
|---|---|---|---|---|---|---|---|---|
| ω-Aminocarboxylic Acid | 6-aminohexanoic acid | g |  |  | 1197 |  |  | 1197 |
|  |  | mol |  |  | 9.1 |  |  | 9.1 |
| Additive | sodium hypochlorite | g | 11.9 | 11.9 | 11.8 | 9.9 | 10.1 | 11.1 |
|  |  | mmol | 112.2 | 112.2 | 111.6 | 93.8 | 95.6 | 104.6 |
|  | sodium acetate | g | 6.4 | 6.4 | 6.4 | 5.4 | 5.5 | 6.0 |
|  |  | mmol | 78.5 | 78.5 | 78.1 | 65.6 | 66.9 | 73.2 |
| Preset Molar Ratio |  | — | 1.000 | 1.000 | 1.000 | 1.000 | 1.000 | 1.000 |
| Compositional | alicyclic diamine | mol % | 44.4 | 44.4 | 42.4 | 50.0 | 50.0 | 50.0 |
| Ratio of | aliphatic dicarboxylic acid | mol % | 44.4 | 38.9 | 42.4 | 50.0 | 45.0 | 45.0 |
| Monomers | aromatic dicarboxylic acid | mol % |  | 5.6 |  |  | 5.0 |  |
|  | amino acid | mol % | 11.2 | 11.1 | 10.5 |  |  |  |
|  | ω-aminocarboxylic acid | mol % |  |  | 4.7 |  |  | 5.0 |
| Amino Acid Content |  | mol % | 11.0 | 9.6 | 10.1 | 0.0 | 0.0 | 0.0 |
| Relative Viscosity |  |  | 1.51 | 1.57 | 1.48 | 1.50 | 1.49 | 1.50 |
| Number-Average Molecular Weight |  |  | 7930 | 8780 | 7450 | 7700 | 7650 | 7720 |
| Melting Point |  | ° C. | 210 | 202 | N.D. | N.D. | N.D. | N.D. |
| Oxygen Absorption Amount (40° C., 100% RH, 28 days) |  | cc/g | 15 | 17 | 8 | 0 | 0 | 0 |

*N.D. = Not detected.

As obvious from the results in Table 4, the polyamide oligomer not copolymerized with a tertiary hydrogen-having α-amino acid did not exhibit oxygen absorption performance (Comparative Examples 401 to 403). On the other hand, the polyamide oligomer copolymerized with a tertiary hydrogen-having α-amino acid exhibited oxygen absorption performance though not using a metal (Examples 401 to 403). Accordingly, the polyamides of the present invention can be used as an oxygen absorbent.

[Industrial Applicability]

The polyamide compound and the polyamide composition of the present invention are excellent in oxygen absorption performance. When used for packaging materials and packaging containers, the polyamide compound or the polyamide composition of the present invention exhibits sufficient oxygen absorption though not containing a metal. Not generating any offensive odor, the polyamide compound or the polyamide composition of the present invention has extremely excellent transparency and therefore provides packaging materials and packaging containers capable of storing the contents therein in a good condition.

The invention claimed is:

1. A polyamide compound, comprising:
   i) from 25 to 50 mol % of a diamine unit comprising at least 50 mol % of an alicyclic diamine unit of formula (I);
   ii) from 25 to 50 mol % of a dicarboxylic acid unit comprising a linear aliphatic dicarboxylic acid unit of formula (II-1), an aromatic dicarboxylic acid unit of formula (II-2), or a mixture thereof in an amount of at least 50 mol % in total; and
   iii) from 0.1 to 50 mol % of a constituent unit of formula (III):

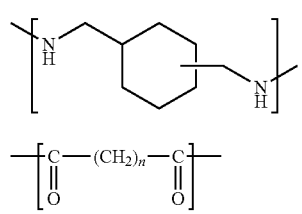

(I)

(II-1)

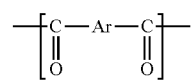

(II-2)

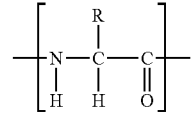

(III)

wherein:
   in formula (II-1), n is an integer of from 2 to 18;
   in formula (II-2), Ar is an arylene group; and
   in formula (III), R is a substituted or unsubstituted alkyl group or a substituted or unsubstituted aryl group.

2. The compound of claim 1, wherein, in formula (III), R is a substituted or unsubstituted alkyl group comprising from 1 to 6 carbon atoms or a substituted or unsubstituted aryl group comprising from 6 to 10 carbon atoms.

3. The compound of claim 1, wherein the linear aliphatic dicarboxylic acid unit comprises at least one selected from the group consisting of an adipic acid unit, a sebacic acid unit, and a 1,12-dodecanedicarboxylic acid unit in an amount of at least 50 mol % in total.

4. The compound of claim 1, wherein the aromatic dicarboxylic acid unit comprises at least one selected from the group consisting of an isophthalic acid unit, a terephthalic acid unit, and a 2,6-naphthalenedicarboxylic acid unit in an amount of at least 50 mol % in total.

5. The compound of claim 1, further comprising:
   iv) an ω-aminocarboxylic acid unit of formula (A), in an amount of from 0.1 to 49.9 mol % in all the constituent units of the polyamide compound:

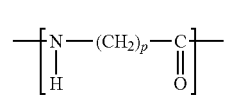

(A)

wherein, in formula (A), p is an integer of from 2 to 18.

6. The compound of claim 5, wherein the ω-aminocarboxylic acid unit comprises a 6-aminohexanoic acid unit, a 12-aminododecanoic acid unit, or a mixture thereof in an amount of at least 50 mol % in total.

7. The compound of claim 1, having a relative viscosity of from 1.8 to 4.2.

8. The compound of claim 1, having a relative viscosity of from 1.01 to less than 1.8.

9. A polyamide composition, comprising the polyamide compound of claim 1.

10. The compound of claim 1, wherein, in formula (III), R is a an alkyl group selected from the group consisting of a methyl group, an ethyl group, a n-propyl group, an isopropyl group, a t-butyl group, a n-octyl group, a 2-ethylhexyl group, a cyclopropyl group, and a cyclopentyl group.

11. The compound of claim 1, wherein, in formula (III), R is a phenyl group or a naphthyl group.

12. The compound of claim 1, wherein the linear aliphatic dicarboxylic acid unit comprises an adipic acid unit in an amount of at least 50 mol % in total.

13. The compound of claim 1, wherein the linear aliphatic dicarboxylic acid unit comprises a sebacic acid unit in an amount of at least 50 mol % in total.

14. The compound of claim 1, wherein the linear aliphatic dicarboxylic acid unit comprises a 1,12-dodecanedicarboxylic acid unit in an amount of at least 50 mol % in total.

15. The compound of claim 1, wherein the aromatic dicarboxylic acid unit comprises an isophthalic acid unit in an amount of at least 50 mol % in total.

16. The compound of claim 1, wherein the aromatic dicarboxylic acid unit comprises a terephthalic acid unit in an amount of at least 50 mol % in total.

17. The compound of claim 1, wherein the aromatic dicarboxylic acid unit comprises a 2,6-naphthalenedicarboxylic acid unit in an amount of at least 50 mol % in total.

18. The compound of claim 5, wherein, in formula (A), p is an integer of from 4 to 14.

19. The compound of claim 5, comprising from 5 to 35 mol % of the ω-aminocarboxylic acid unit.

* * * * *